United States Patent
Zhang et al.

(10) Patent No.: US 11,490,419 B2
(45) Date of Patent: Nov. 1, 2022

(54) CONTENTION WINDOW UPDATES WITH INTEGRATED ACCESS AND BACKHAUL NODES FOR UNLICENSED OPERATIONS

(71) Applicant: QUALCOMM Incorporated, San Diego, CA (US)

(72) Inventors: Xiaoxia Zhang, San Diego, CA (US); Jing Sun, San Diego, CA (US); Jianghong Luo, Skillman, NJ (US); Tao Luo, San Diego, CA (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 17/092,178

(22) Filed: Nov. 6, 2020

(65) Prior Publication Data
US 2022/0150961 A1 May 12, 2022

(51) Int. Cl.
*H04W 74/08* (2009.01)
*H04L 47/27* (2022.01)

(52) U.S. Cl.
CPC ......... *H04W 74/0808* (2013.01); *H04L 47/27* (2013.01); *H04W 74/0833* (2013.01)

(58) Field of Classification Search
CPC .......... H04W 74/0808; H04W 74/0833; H04L 47/27
See application file for complete search history.

(56) References Cited

U.S. PATENT DOCUMENTS

| | | | |
|---|---|---|---|
| 11,272,532 B2 * | 3/2022 | Jeon | H04L 5/0053 |
| 2018/0070252 A1 * | 3/2018 | Gupta | H04W 56/001 |
| 2020/0145967 A1 * | 5/2020 | Park | H04W 72/042 |
| 2021/0007149 A1 * | 1/2021 | Li | H04W 74/0833 |
| 2021/0058826 A1 * | 2/2021 | Mao | H04W 28/0933 |
| 2021/0112593 A1 * | 4/2021 | Lunttila | H04W 74/0808 |
| 2021/0195541 A1 * | 6/2021 | Wei | H04B 7/15557 |
| 2021/0195674 A1 * | 6/2021 | Park | H04W 72/0406 |
| 2021/0195675 A1 * | 6/2021 | Park | H04W 88/14 |
| 2021/0274553 A1 * | 9/2021 | Xue | H04W 74/0825 |
| 2021/0352607 A1 * | 11/2021 | Miao | H04W 56/0045 |
| 2021/0352700 A1 * | 11/2021 | Lohr | H04W 28/0278 |
| 2021/0360673 A1 * | 11/2021 | Myung | H04L 1/1854 |
| 2021/0392685 A1 * | 12/2021 | Myung | H04W 74/0816 |

(Continued)

*Primary Examiner* — Wutchung Chu
(74) *Attorney, Agent, or Firm* — Holland & Hart LLP

(57) ABSTRACT

Methods, systems, and devices for wireless communications are described. An integrated access and backhaul (IAB) system may perform contention window updates on an IAB node for different components of the IAB node. In some implementations, the IAB node may perform separate contention window updates in separate reference durations for the different components. Additionally or alternatively, the IAB node may perform a joint contention window update for the different components, where a single reference duration for updating contentions windows for the components may be defined for the IAB node that includes transmissions for both components. Additionally or alternatively, the IAB node may perform separate contention window updates for the different components based on the single reference duration that includes transmissions for both components, where feedback may be used separately to update corresponding contention windows.

30 Claims, 19 Drawing Sheets

(56) References Cited

U.S. PATENT DOCUMENTS

| | | | |
|---|---|---|---|
| 2022/0039016 A1* | 2/2022 | Terry | H04W 52/0235 |
| 2022/0039163 A1* | 2/2022 | Park | H04L 5/0048 |
| 2022/0053482 A1* | 2/2022 | Yang | H04W 72/0413 |
| 2022/0060246 A1* | 2/2022 | Tiirola | H04B 7/2643 |
| 2022/0060277 A1* | 2/2022 | Wei | H04W 72/0446 |
| 2022/0070743 A1* | 3/2022 | Thangarasa | H04W 36/0022 |
| 2022/0070939 A1* | 3/2022 | Shin | H04W 74/0833 |
| 2022/0078822 A1* | 3/2022 | Myung | H04W 72/0453 |
| 2022/0078841 A1* | 3/2022 | Tiirola | H04W 74/0808 |

* cited by examiner

CONTENTION WINDOW UPDATES WITH INTEGRATED ACCESS AND BACKHAUL NODES FOR UNLICENSED OPERATIONS

FIELD OF TECHNOLOGY

The following relates to wireless communications, including contention window updates with integrated access and backhaul (IAB) nodes for unlicensed operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support integrated access and backhaul (IAB) communications. For example, an IAB node may include a mobile terminal (MT) component for communications with an IAB parent node (e.g., an IAB donor) and a distributed unit (DU) component for communications with an IAB child node (e.g., one or more UEs or another IAB node). Efficient techniques are desired for incorporating IAB nodes into existing communication systems.

SUMMARY

The described techniques relate to improved methods, systems, devices, and apparatuses that support contention window updates with integrated access and backhaul (IAB) nodes for unlicensed operations. Generally, the described techniques provide for an IAB node to determine reference durations for different components of the IAB node, where the reference durations are used for monitoring for indications to then adjust a contention window. For example, the IAB node may include a first component (e.g., a mobile terminal (MT) component) for communications with at least a parent node and a second component (e.g., a distributed unit (DU)) component) for communications with at least a child node. Accordingly, the IAB node may determine a first reference duration for the first component and a second reference duration for the second component or may determine a single reference duration for both the first component and the second component.

Subsequently, if the IAB node identifies an indication during one of the reference durations, the IAB node may adjust a contention window for the corresponding component (e.g., a first indication identified during the first reference duration may result in a first contention window for the first component being adjusted, a second indication identified during the second reference duration may result in a second contention window for the second component being adjusted, etc.). Additionally or alternatively, for the single reference duration, if the IAB node identifies an indication during the single reference duration, the IAB node may adjust contention windows for both components. In some implementations, the single reference duration may include portions corresponding to reference durations for each component, where an indication identified in a respective portion of the single reference duration may result in the IAB node adjusting a contention window for the component corresponding to the respective portion (e.g., a first contention window is adjusted for the first component based on identifying a first indication during a first portion for the first component during the single reference duration, a second contention window is adjusted for the second component based on identifying a second indication during a second portion for the second component during the single reference duration, etc.).

A method for wireless communications at an IAB node including a first component for communications with at least a parent node and a second component for communications with at least a child node is described. The method may include determining a first reference duration for the first component and a second reference duration for the second component, monitoring for a first indication during the first reference duration to update a first contention window for the first component and for a second indication during the second reference duration to update a second contention window for the second component, and adjusting at least one of the first contention window and the second contention window based on the monitoring for the first indication and the second indication.

An apparatus for wireless communications at an IAB node including a first component for communications with at least a parent node and a second component for communications with at least a child node is described. The apparatus may include a processor, memory in electronic communication with the processor, and instructions stored in the memory. The instructions may be executable by the processor to cause the apparatus to determine a first reference duration for the first component and a second reference duration for the second component, monitor for a first indication during the first reference duration to update a first contention window for the first component and for a second indication during the second reference duration to update a second contention window for the second component, and adjust at least one of the first contention window and the second contention window based on the monitoring for the first indication and the second indication.

Another apparatus for wireless communications at an IAB node including a first component for communications with at least a parent node and a second component for communications with at least a child node is described. The apparatus may include means for determining a first reference duration for the first component and a second reference duration for the second component, means for monitoring for a first indication during the first reference duration to update a first contention window for the first component and for a second indication during the second reference duration to update a second contention window for the second component, and means for adjusting at least one of the first contention window and the second contention window based on the monitoring for the first indication and the second indication.

A non-transitory computer-readable medium storing code for wireless communications at an IAB node including a first component for communications with at least a parent node and a second component for communications with at least a child node is described. The code may include instructions executable by a processor to determine a first reference duration for the first component and a second reference duration for the second component, monitor for a first indication during the first reference duration to update a first contention window for the first component and for a second indication during the second reference duration to update a second contention window for the second component, and adjust at least one of the first contention window and the second contention window based on the monitoring for the first indication and the second indication.

Some examples of the method, apparatuses, and non-transitory computer-readable medium described herein may further include operations, features, means, or instructions for initiating a channel occupancy time (COT) by the first component, where the first contention window may be determined to be adjusted for the COT based on the monitoring for the first indication.

Some examples of the method, apparatuses, and non-transitory computer-readable medium described herein may further include operations, features, means, or instructions for refraining from adjusting the second contention window based on the monitoring for the first indication.

Some examples of the method, apparatuses, and non-transitory computer-readable medium described herein may further include operations, features, means, or instructions for initiating a COT by the second component, where the second contention window may be determined to be adjusted for the COT based on the monitoring for the second indication.

Some examples of the method, apparatuses, and non-transitory computer-readable medium described herein may further include operations, features, means, or instructions for refraining from adjusting the first contention window based on the monitoring for the second indication.

Some examples of the method, apparatuses, and non-transitory computer-readable medium described herein for determining the first reference duration for the first component and the second reference duration for the second component may further include operations, features, means, or instructions for determining an overall reference duration for the IAB node that includes a first portion for the first reference duration and a second portion for the second reference duration and monitoring for the first indication during the first portion of the overall reference duration and for the second indication during the second portion of the overall reference duration.

Some examples of the method, apparatuses, and non-transitory computer-readable medium described herein may further include operations, features, means, or instructions for determining a first random counter for a first channel access procedure for the first component and a second random counter for a second channel access procedure for the second component.

In some examples of the method, apparatuses, and non-transitory computer-readable medium described herein, the first random counter may be used for a COT initiated by the first component and may be based on the first contention window for the first component.

In some examples of the method, apparatuses, and non-transitory computer-readable medium described herein, the second random counter may be used for a COT initiated by the second component and may be based on the second contention window for the second component.

Some examples of the method, apparatuses, and non-transitory computer-readable medium described herein may further include operations, features, means, or instructions for determining a joint random counter for a first channel access procedure for the first component and second channel access procedure for the second component.

In some examples of the method, apparatuses, and non-transitory computer-readable medium described herein, the joint random counter may be based on a maximum contention window size, a minimum contention window size, an average contention window size, or an additional function of the first contention window and the second contention window.

Some examples of the method, apparatuses, and non-transitory computer-readable medium described herein for determining the first reference duration for the first component may further include operations, features, means, or instructions for determining a starting point for the first reference duration and an ending point for the first reference duration.

In some examples of the method, apparatuses, and non-transitory computer-readable medium described herein, the starting point for the first reference duration may include a start of a channel occupancy initiated by the first component.

In some examples of the method, apparatuses, and non-transitory computer-readable medium described herein, the ending point for the first reference duration may include a slot boundary where at least one uplink channel may be transmitted or an end of a transmission burst that contains a transmitted uplink channel.

Some examples of the method, apparatuses, and non-transitory computer-readable medium described herein for determining the second reference duration for the second component may further include operations, features, means, or instructions for determining a starting point for the second reference duration and an ending point for the second reference duration.

In some examples of the method, apparatuses, and non-transitory computer-readable medium described herein, the starting point for the second reference duration may include a start of a channel occupancy initiated by the second component.

In some examples of the method, apparatuses, and non-transitory computer-readable medium described herein, the ending point for the second reference duration may include a slot boundary where at least one downlink channel may be fully transmitted or an end of a transmission burst that contains a fully transmitted downlink channel.

In some examples of the method, apparatuses, and non-transitory computer-readable medium described herein, the first indication may include a new data indicator (NDI) for a message transmitted during the first reference duration, a value of a code block group (CBG) transmission information field for a CBG transmitted during the first reference duration, or a combination thereof.

In some examples of the method, apparatuses, and non-transitory computer-readable medium described herein, the second indication may include an acknowledgment message received during the second reference duration, an amount of acknowledgment messages that exceeds a threshold value received during the second reference duration, successfully receiving an uplink channel on granted resources during the second reference duration, or a combination thereof.

A method for wireless communications at an IAB node including a first component for communications with at least a parent node and a second component for communications with at least a child node is described. The method may include determining a reference duration for the first component and the second component, monitoring for an indication during the reference duration to update a first contention window for the first component and a second contention window for the second component, and adjusting the first contention window and the second contention window based on the monitoring.

An apparatus for wireless communications at an IAB node including a first component for communications with at least a parent node and a second component for communications with at least a child node is described. The apparatus may include a processor, memory in electronic communication with the processor, and instructions stored in the memory. The instructions may be executable by the processor to cause the apparatus to determine a reference duration for the first component and the second component, monitor for an indication during the reference duration to update a first contention window for the first component and a second contention window for the second component, and adjust the first contention window and the second contention window based on the monitoring.

Another apparatus for wireless communications at an IAB node including a first component for communications with at least a parent node and a second component for communications with at least a child node is described. The apparatus may include means for determining a reference duration for the first component and the second component, means for monitoring for an indication during the reference duration to update a first contention window for the first component and a second contention window for the second component, and means for adjusting the first contention window and the second contention window based on the monitoring.

A non-transitory computer-readable medium storing code for wireless communications at an IAB node including a first component for communications with at least a parent node and a second component for communications with at least a child node is described. The code may include instructions executable by a processor to determine a reference duration for the first component and the second component, monitor for an indication during the reference duration to update a first contention window for the first component and a second contention window for the second component, and adjust the first contention window and the second contention window based on the monitoring.

Some examples of the method, apparatuses, and non-transitory computer-readable medium described herein may further include operations, features, means, or instructions for initiating a COT by the first component or by the second component, where the first contention window and the second contention window may be determined to be adjusted for the COT based on the monitoring for the indication.

Some examples of the method, apparatuses, and non-transitory computer-readable medium described herein may further include operations, features, means, or instructions for determining a first random counter for a first channel access procedure for the first component and a second random counter for a second channel access procedure for the second component.

In some examples of the method, apparatuses, and non-transitory computer-readable medium described herein, the first random counter may be used for a COT initiated by the first component and may be based on the first contention window for the first component.

In some examples of the method, apparatuses, and non-transitory computer-readable medium described herein, the second random counter may be used for a COT initiated by the second component and may be based on the second contention window for the second component.

Some examples of the method, apparatuses, and non-transitory computer-readable medium described herein may further include operations, features, means, or instructions for determining a joint random counter for a first channel access procedure for the first component and second channel access procedure for the second component.

In some examples of the method, apparatuses, and non-transitory computer-readable medium described herein, the joint random counter may be based on a maximum contention window size, a minimum contention window size, an average contention window size, or an additional function of the first contention window and the second contention window.

Some examples of the method, apparatuses, and non-transitory computer-readable medium for determining the reference duration may further include operations, features, means, or instructions for determining a starting point for the reference duration and an ending point for the reference duration.

In some examples of the method, apparatuses, and non-transitory computer-readable medium described herein, the starting point for the reference duration may include a start of a channel occupancy initiated by the first component or by the second component.

In some examples of the method, apparatuses, and non-transitory computer-readable medium described herein, the ending point for the reference duration may include a slot boundary where at least one downlink channel may be fully transmitted, an end of a transmission burst that contains a fully transmitted downlink channel, a slot boundary where at least one uplink channel may be transmitted, or an end of a transmission burst that contains a transmitted uplink channel.

In some examples of the method, apparatuses, and non-transitory computer-readable medium described herein, the indication includes an NDI for a message transmitted during the first reference duration, a value of a CBG transmission information field for a CBG transmitted during the first reference duration, an acknowledgment message received during the second reference duration, an amount of acknowledgment messages that exceeds a threshold value received during the second reference duration, successfully receiving an uplink channel on granted resources during the second reference duration, or a combination thereof.

DETAILED DESCRIPTION

Figure 1:
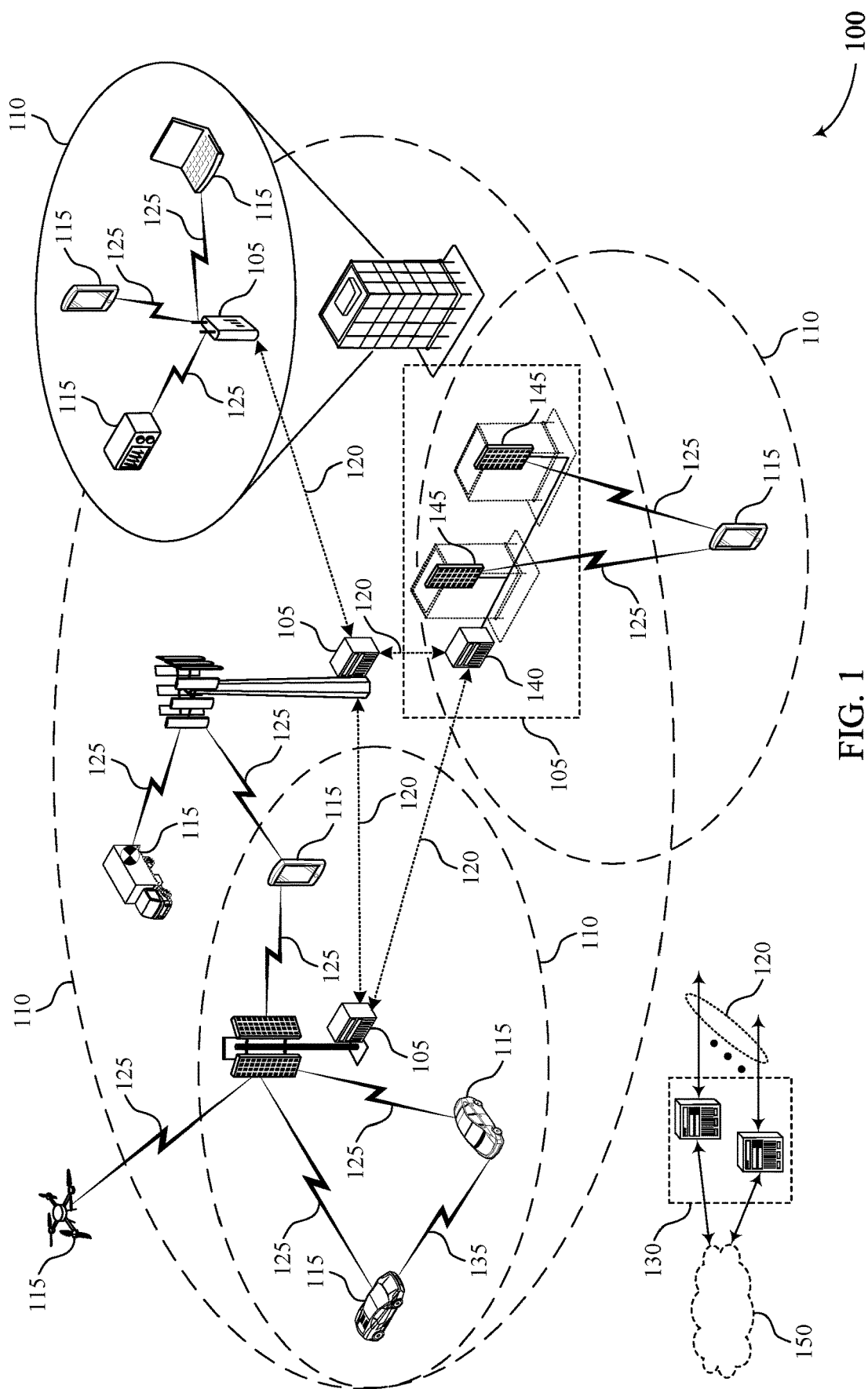
FIG. 1 illustrates an example of a wireless communications system that supports contention window updates with integrated access and backhaul (IAB) nodes for unlicensed operations in accordance with aspects of the present disclosure.

Some wireless communications systems may support integrated access and backhaul (IAB) communications. For example, an IAB node may include a mobile terminal (MT) component (e.g., a first component) for communications with an IAB parent node (e.g., an IAB donor) and a distributed unit (DU) component (e.g., a second component) for communications with an IAB child node (e.g., one or more UEs or another IAB node). Additionally, for unlicensed operations, the IAB node may maintain a contention window, where the IAB node attempts to access a channel once the contention window ends. The IAB node may also adjust the contention window for subsequent attempts to access the channel based on receiving acknowledgment messages (e.g., the contention window is reset for positive acknowledgement messages or extended for negative acknowledgment messages), identifying new data indicators (NDIs), identifying code block group (CBG) transmission indicators, etc. during contention window reference durations, where these reference durations differ based on downlink or uplink transmission directions. As such, since the IAB node includes both the DU (e.g., for downlink communications to the child nodes) and the MT (e.g., for uplink communications to the parent node), the IAB node may not have a single reference duration for determining to update contention windows for the DU and for the MT.

As described herein, an IAB system may perform contention window updates on an IAB node for both DU and MT components with time-division multiplexing (TDM) transmission between the DU and the MT. In some implementations, the IAB node may perform separate contention window updates in separate reference durations (e.g., channel occupancy times (COTs)) for the MT and for the DU. As such, a first reference duration for a DU contention window update may apply to a COT initiated by the DU, and a second reference duration for an MT contention window update may apply to a COT initiated by the MT. Additionally or alternatively, the IAB node may perform a joint contention window update for the MT and the DU. Accordingly, a reference duration may be defined for the IAB node that includes both DU and MT transmissions, where feedback for the IAB node to update the contention window can include feedback for the DU transmissions as well as feedback for the MT transmissions (e.g., feedback for either will update the contention window for both). Additionally or alternatively, the IAB node may perform separate contention window updates for the MT and for the DU based on a reference duration that includes both DU and MT transmissions. However, the feedback (e.g., for either DU or MT) may be used separately for a DU contention window update and for an MT contention window update.

Aspects of the disclosure are initially described in the context of wireless communications systems. Additionally, aspects of the disclosure are illustrated through an additional wireless communications system, an IAB configuration, examples of reference durations, reference duration configurations for IAB nodes, and a process flow. Aspects of the disclosure are further illustrated by and described with reference to apparatus diagrams, system diagrams, and flowcharts that relate to contention window updates with IAB nodes for unlicensed operations.

FIG. 1 illustrates an example of a wireless communications system 100 that supports contention window updates with IAB nodes for unlicensed operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be coupled to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems (such as, unlicensed spectrum communications), a device may perform a listen-before-talk (LBT) procedure (such as, a clear channel assessment (CCA)) to determine whether a channel or frequency is available prior to using the channel/frequency for communications. For example, the LBT procedure may include the device using an energy detection (ED) threshold to determine if the channel is currently occupied, such that if a detected energy is below the ED threshold, the channel is determined to be available, and if the detected energy exceeds the ED threshold, the channel is determined to be occupied. If the LBT procedure indicates the channel/frequency is available, the device may be granted access to the channel/frequency for a certain amount of time before the channel/frequency is again potentially available for other devices to use. This certain amount of time may be referred to as a channel occupancy time (COT), where the device is occupying (e.g., using) the channel/frequency. In some implementations, the COT may be shared between uplink and downlink communications between the device and a base station, as an example.

In some implementations, a wireless communications system using unlicensed radio frequency spectrum bands may support devices to share a COT. When a wireless device (e.g., a UE 115) successfully performs a CCA, such as an LBT, the wireless device is given a COT to perform wireless communications. The wireless device may share the COT with another wireless device, which may improve medium access within the COT from one node to another node.

For example, the wireless communications system 100 may support uplink and downlink COT sharing. A base station 105 may acquire a COT with an extended CCA and share the COT with multiple UEs 115 for the UEs 115 to transmit uplink signals. Within the COT acquired by the base station 105, a UE 115 may use a single shot CCA for the uplink transmission. In some implementations, a UE 115 may not perform an LBT to begin an uplink transmission in the shared COT. In some implementations, the type of LBT performed by the UE 115 may be based on certain conditions. For example, a Category 2 LBT may be used for a certain durations of downlink-to-uplink gaps (e.g., between gaps of approximately 16 microseconds (μs) and 25 μs or gaps beyond 25 μs within a base station acquired COT), and a Category 1 LBT may be used for smaller downlink-to-uplink gaps (e.g., gaps shorter than approximately 16 μs).

An LBT procedure may include different Categories for attempting to access an unlicensed frequency band. For example, a Category 1 LBT may enable a UE 115 (or a different device) to transmit a message on the unlicensed frequency band after a switching gap of approximately 16 μs. A Category 2 LBT may include an LBT without a random back-off (RBO), in which a CCA period (e.g., a time duration where a device listens to the unlicensed frequency band to determine if signaling is present or not) is deterministic (for example, a duration of time that the channel is sensed to be idle or not before a transmitting entity transmits may be deterministic, such as fixed to 25 μs).

A Category 3 LBT may include an LBT with an RBO with a contention window of a fixed size, in which an extended CCA period is drawn by a random number within a fixed contention window (e.g., a random number is used in the LBT procedure to determine the duration of time that the channel is sensed to be idle or not before the transmitting entity transmits on the channel). A Category 4 LBT may include an LBT with an RBO with a contention window of a variable size, in which an extended CCA period is drawn by a random number within a contention window, whose size can vary based on channel dynamics (e.g., the transmitting entity can vary the size of the contention window when drawing a random number, and the random number is used in the LBT procedure to determine the duration of time that the channel is sensed to be idle before the transmitting entity transmits on the channel). The different Categories may be used for different scenarios. For example, the Category 4 LBT may be used by a base station 105 or a UE 115 to initiate a COT for data transmissions, while a base station 105 may use the Category 2 LBT for signaling such as discovery reference signals.

When a device goes into a backoff state, the device may wait an additional, randomly selected number of time slots before attempting to communicate (e.g., the random number may be greater than 0 and smaller than a maximum value referred to as the contention window). During the wait, the device may continue sensing the channel (e.g., medium) to check whether the channel remains free or another transmission begins. At the end of the contention window, if the channel is still free, the device may use the channel to communicate. If during the contention window another device begins transmitting data, the back-off counter may be frozen, and counting down may start again when the channel returns to an idle state.

That is, the contention window may include an amount of time, where a device attempts to access a channel once the contention window expires. With a small contention window, if many devices attempt to transmit data at the same time, some of the devices may have a same backoff interval, which may lead to collisions affecting the network performance. Conversely, with a large contention window, if few devices attempt to transmit data, the devices may have long backoff delays resulting in degradation of network performance.

Each device may use different contention windows with variable sizes to reduce the likelihood of collisions and to enable fairer contention for a channel. When the contention window is a variable size (e.g., for a Category 4 LBT), a device performing an LBT may wait different amounts of time before attempting to access for the channel. In some implementations, the contention window may have a minimum size, where the contention window can then be extended for subsequent CCA procedures based on whether a previous CCA procedure is successful or not. For example, if a first CCA procedure is unsuccessful with a first contention window size (e.g., greater than or equal to the minimum contention window size), the device may extend the contention window (e.g., up to a maximum contention window size). Alternatively, for a given CCA procedure, if the CCA procedure is successful, the device may reset the contention window size (e.g., to the minimum contention window size or a different random size) for a subsequent CCA procedure.

The device may determine if a CCA procedure is successful or not for adjusting the contention window size based on feedback or an indication for the CCA procedure. For example, the feedback or indication may include acknowledgment feedback, an NDI, or an additional indication. For downlink communications, if the device receives a positive acknowledgment (ACK) message (e.g., an ACK or a different implicit positive acknowledgment message) for communications occurring based on the CCA procedure, the device may then reset the contention window size. For uplink communications, if an NDI is toggled for a transport block transmitted, the device may also reset the contention window size. For CBG communications, the device may reset the contention window size if positive acknowledgement messages are received for at least 10% of the CBGs or if a CBG transmission indicator is set to a particular value (e.g., '0'). Additionally or alternatively, if an uplink grant is received, the device may reset the contention window if an uplink transmission is successful on resources indicated in the uplink grant.

The device may monitor for these types of feedback or indications during a reference duration defined for contention window adjustments based on whether the device is attempting to transmit uplink or downlink messages. For example, for downlink communications, the reference duration for contention window adjustments may begin at the beginning of a channel occupancy (e.g., beginning of COT) and may end at an ending of a slot boundary where a downlink message is fully transmitted or an end of a transmission burst that contains a fully transmitted downlink message. Additionally or alternatively, for uplink communications, the reference duration for contention window adjustments may also begin at the beginning of a channel occupancy (e.g., beginning of COT) but may end at an ending of a slot boundary where an uplink channel is transmitted (e.g., partial or fully) or an end of a transmission burst that contains an uplink channel. Accordingly, the device may monitor for the feedback or indications during these reference durations, and depending on the feedback or indications, the device may then adjust (e.g., reset, extend, etc.) the contention window for a subsequent CCA procedure to attempt to communicate on the unlicensed resources.

Additionally, some wireless communications systems may support IAB communications. For example, an IAB node may include an MT component (e.g., a first component) for communications with an IAB parent node (e.g., an IAB donor) and a DU component (e.g., a second component) for communications with an IAB child node (e.g., one or more UEs or another IAB node). That is, the IAB node may support both uplink and downlink communications, where the MT component acts as a UE for its parent node and the DU component acts as a base station for its child nodes.

However, with both uplink and downlink communications being supported for the IAB node on the corresponding components, if the IAB node attempts to use unlicensed resources for communications, it is unknown how the IAB node may configure or determine a reference duration for adjusting a contention window for either component since the reference durations are based on whether a CCA procedure is performed for uplink or downlink communications as described previously.

Wireless communications system 100 may support efficient techniques for an IAB node to determine reference durations for the MT component and the DU component, where the IAB node adjusts contention windows for the MT component or the DU component based on feedback or indications identified for the corresponding component during the determined reference durations. Additionally or alternatively, the IAB node may determine a single reference duration for the MT component and the DU component, where the IAB node adjusts contention windows for both the MT component and the DU component based on feedback or indications identified for either component during the single reference duration. In some implementations, with the single reference duration, the IAB node may determine separate portions in the single reference duration for the MT component and for the DU component, such that the IAB node adjusts contention windows for either the MT component, the DU component, or both based on feedback or indications received in the corresponding, separate portions. Additionally, the IAB node may determine independent random counters for CCA procedures for the MT component and for the DU component or a joint random counter for both the MT component and the DU component.

Figure 2:
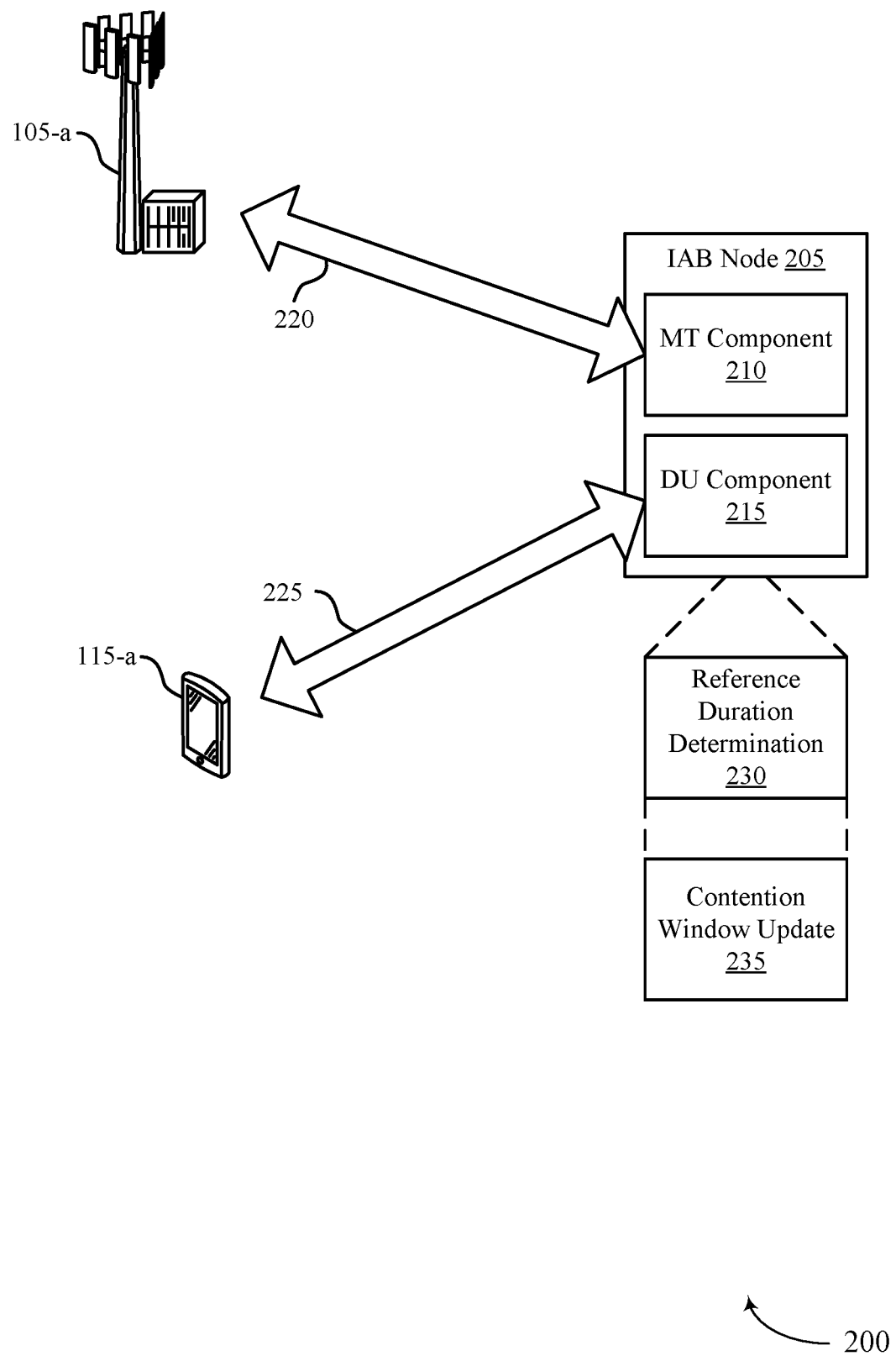
FIG. 2 illustrates an example of a wireless communications system that supports contention window updates with IAB nodes for unlicensed operations in accordance with aspects of the present disclosure.

FIG. 2 illustrates an example of a wireless communications system 200 that supports contention window updates with IAB nodes for unlicensed operations in accordance with aspects of the present disclosure. Wireless communications system 200 may implement aspects of wireless communications system 100. For example, wireless communications system 200 may include an IAB node 205 that includes both an MT component 210 (e.g., a first component) and a DU component 215 (e.g., a second component). Additionally, the MT component 210 may communicate with a base station 105-a (e.g., a parent node) on resources of a carrier 220, and the DU component 215 may communicate with a UE 115-a (e.g., a child node, an additional IAB node, etc.) on resources of a carrier 225. In some implementations, the communications for the MT component 210 and the DU component 215 may occur based on TDM transmissions between the MT component 210 and the DU component 215.

The wireless communications system 200 may support communications over unlicensed radio frequency spectrum. For example, the IAB node 205 may attempt to communicate with the base station 105-a and the UE 115-a via the corresponding components using unlicensed or shared resources. Accordingly, the IAB node may perform CCA procedures (e.g., LBT procedures) to determine whether the resources are available prior to using them for communications. As part of the CCA procedures, the IAB node may use contention windows and reference durations that are used to adjust the contention windows as described previously with reference to FIG. 1. However, since the MT component 210 uses uplink communications and the DU component 215 uses downlink communications, issues may arise for the IAB node 205 to determine a reference duration to adjust contention windows for both the MT component 210 and the DU component 215 when the reference duration is dependent on whether the communications are uplink or downlink.

As described herein, the IAB node 205 may perform a contention window update for the MT component 210 and the DU component 215 using separate reference durations or a joint reference duration, where specific feedback or indications identified during the reference duration(s) are used to adjust the contention windows for the MT component 210, the DU component 215, or both. DU and MT components. For example, the IAB node 205 may perform separate contention window updates based on separate COTs for the MT component 210 and the DU component 215. That is, the IAB node 205 may determine separate reference durations for the MT component 210 and the DU component 215 (e.g., a first reference duration for the MT component 210 and a second reference duration for the DU component 215) for corresponding COTs for either component, where feedback or an indication identified during one of the reference durations may result in the IAB node 205 adjusting a contention window for the component corresponding to the reference duration.

Additionally or alternatively, the IAB node 205 may perform a joint contention window update for the MT component 210 and the DU component 215. For example, the IAB node may determine a joint reference duration for both the MT component 210 and the DU component 215 regardless of which component initiates a COT, where feedback or an indication identified during the joint reference duration may result in the IAB node 205 adjusting contention windows for both the MT component 210 and the DU component 215. In some implementations, the IAB node may perform separate contention window updates using the joint reference duration. For example, the joint reference duration may include a first portion for the MT component 210 and a second portion for the DU component 215, where contention windows are updated for the MT component 210, the DU component 215, or both based on feedback or indications identified during the corresponding portions.

In some implementations, with separate contention window updates (e.g., or with the joint contention window update as well), the IAB node 205 may determine random counters (e.g., for RBO) in different ways for the CCA procedures (e.g., LBT procedure) on the MT component 210 and the DU component 215. For example, the IAB node 205 may determine independent random counters for the MT component 210 and for the DU component 215. When the IAB node 205 initiates a COT starting for transmissions for the DU component 215, the IAB node may use a contention window corresponding to the DU component 215 to generate a first random counter. When the IAB node 205 initiates a COT starting for transmissions for the MT component 210, the IAB node 205 may use a contention window corresponding to the MT component 210 to generate a second random counter. Additionally or alternatively, the IAB node 205 may determine a joint random counter for the MT component 210 and the DU component 215. Accordingly, when the IAB node 205 initiates a COT, the IAB node 205 may apply the joint contention window across the MT component 210 and the DU component 215 to generate the random number for a COT for either the MT component 210 or the DU component 215. The joint contention window may be a maximum, a minimum, an average, or any other functions of the contention window for the MT component 210 and the DU component 215.

Figure 3:
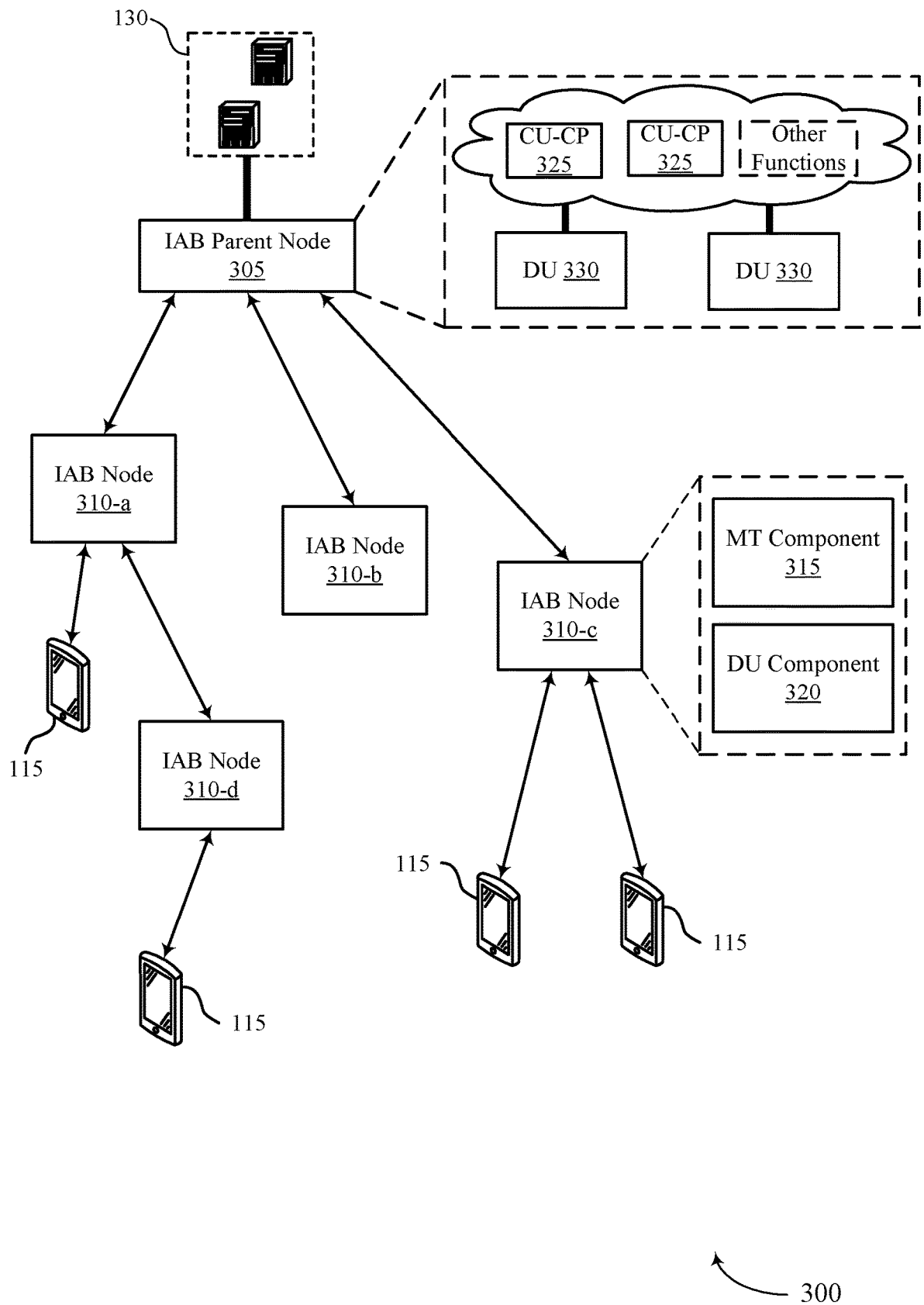
FIG. 3 illustrates an example of an IAB configuration in accordance with aspects of the present disclosure.

FIG. 3 illustrates an example of an IAB configuration 300 in accordance with aspects of the present disclosure. IAB configuration 300 may implement aspects of wireless communications systems 100 and 200. For example, the IAB configuration 300 may include the core network 130, one or more IAB nodes, and one or more UEs 115. The core network 130 may be connected to an IAB parent node 305 (e.g., a base station 105, a network device, etc.), and the IAB parent node 305 may be connected to one or more IAB nodes 310, such as a first IAB node 310-*a*, a second IAB node 310-*b*, and a third IAB node 310-*c*. Each of the IAB nodes 310 may include an MT component 315 and a DU component 320.

The IAB parent node 305 (e.g., IAB-donor) may provide a UE interface to the core network 130 and wireless backhauling functionality to the IAB nodes 310. For example, the IAB parent node 305 may include one or more centralized unit (CU) control plane functions 325 (e.g., and other functions) to communicate with the core network 130 (e.g., via wireline internet protocol (IP) connections) and may include one or more DUs 330 to communicate with the IAB nodes 310 (e.g., via wireless backhaul links). Each of the IAB nodes 310 may communicate with the respective child nodes via wireless access links.

As previously described, the IAB nodes 310 may include different components for different types of communications. For example, the MT component 315 may act as a UE for the IAB parent node 305 (e.g., for uplink communications to the IAB parent node 305). Additionally, the DU component 320 may act as a base station for one or more child nodes (e.g., for downlink communications with the one or more child nodes, such as UEs 115 and other IAB nodes 310) with layer-2 functionalities (e.g., MAC scheduler).

Based on including the MT component 315 and the DU component 320 that support transmitting uplink communications and downlink communications, respectively, different issues may arise for accommodating the different transmission directions. Among these different issues and as described herein, the IAB nodes 310 may not know how to perform LBT procedures (e.g., or a different CCA procedure) using different contention windows and reference durations that are dependent on whether the LBT procedure is performed for uplink communications or for downlink communications.

Accordingly, the techniques described herein may enable an IAB node 310 to perform LBT procedures for the MT component 315 and the DU component 320 with adjusting contention windows for each component based on separate reference durations for each component or a joint reference duration for both components. For example, with the separate reference durations, the IAB node 310 may adjust contention windows for one of the components based on identifying feedback or an indication during the corresponding reference duration. Additionally or alternatively, with the joint reference duration, the IAB node may adjust contention windows for both components based on identifying feedback or an indication during the joint reference duration or may adjust contention windows for one of the components based on identifying feedback or an indication during a portion of the joint reference duration corresponding to the one component.

Figure 4A:
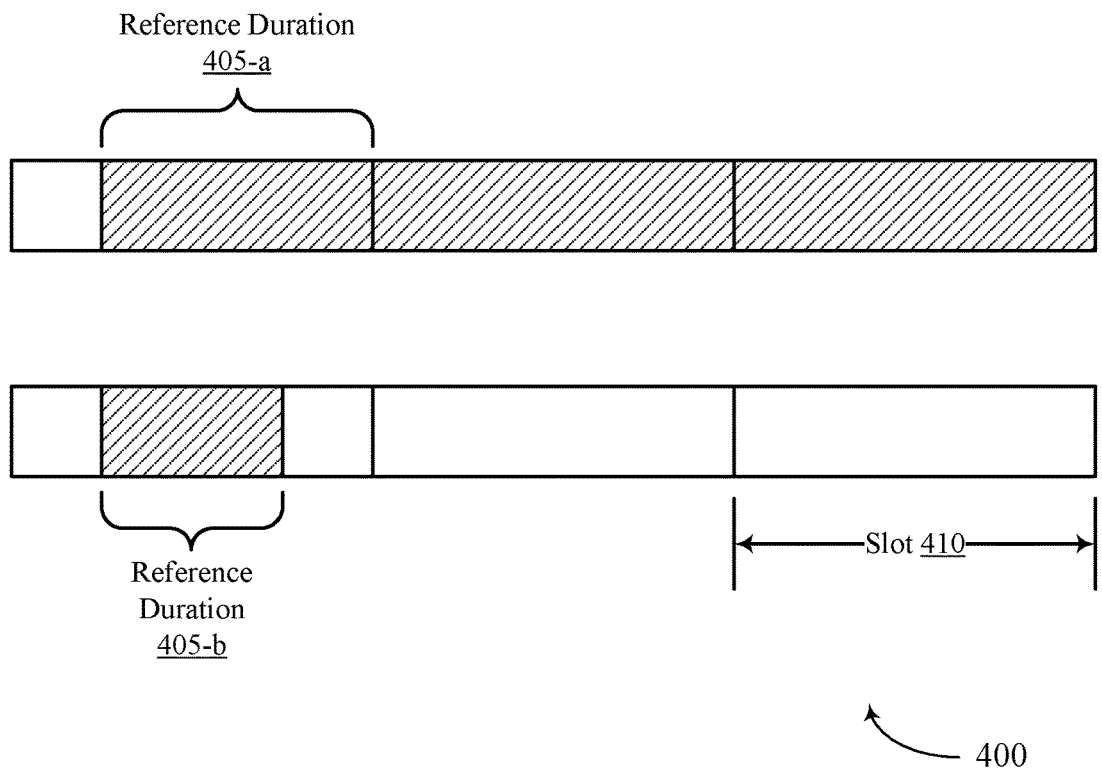
FIGS. 4A and 4B illustrate examples of reference duration configurations that support contention window updates for unlicensed operations in accordance with aspects of the present disclosure.
Figure 4B:
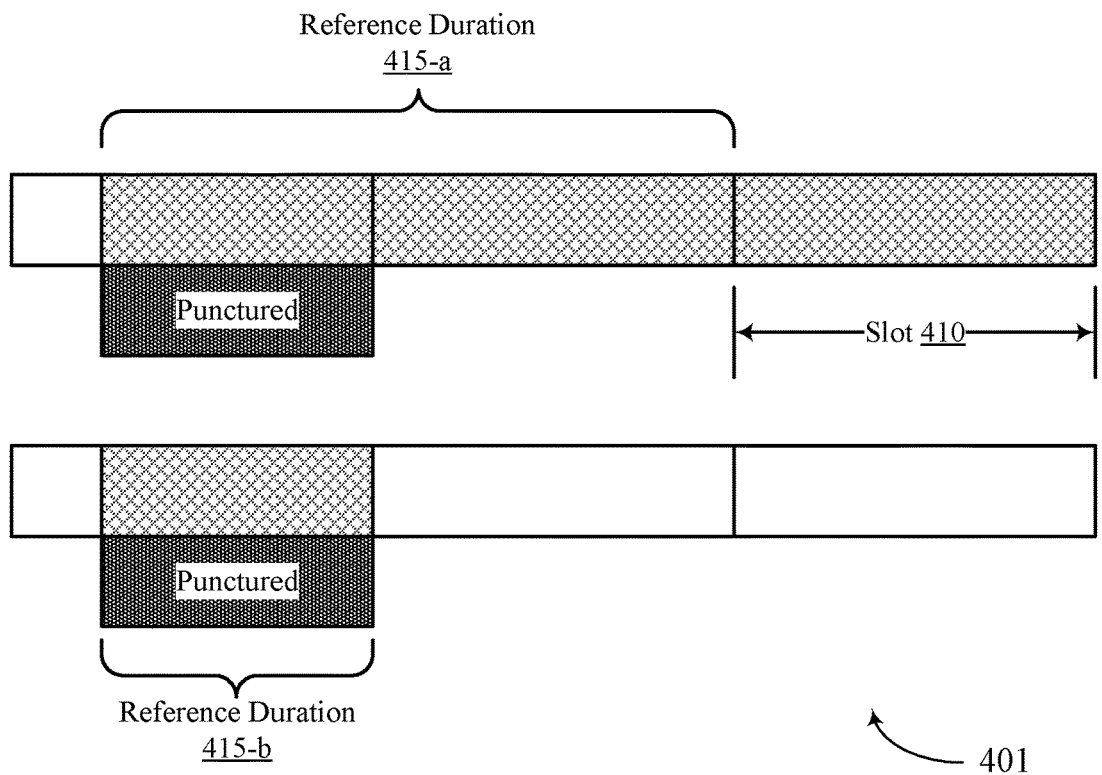

FIGS. 4A and 4B illustrate examples of reference duration configurations 400 and 401 that support contention window updates for unlicensed operations in accordance with aspects of the present disclosure. Reference duration configurations 400 and 401 may implement aspects of wireless communications systems 100 and 200. For example, a wireless device may use reference duration configurations 400 and 401 as part of CCA or LBT procedures to determine when and how to adjust contention windows for the CCA or LBT procedures.

A wireless device (e.g., a UE 115, an MT component of an IAB node, etc.) may use reference duration configuration 400 for contention window adjustment to access unlicensed resources for uplink transmissions. This uplink contention window reference duration may consider an initiated COT for the wireless device with an uplink channel (e.g., a physical uplink shared channel (PUSCH)). The contention window size reference duration may be maintained per LBT bandwidth and may consider a channel occupancy with PUSCH (e.g., partially) in the LBT bandwidth. In some cases, transmissions on the uplink channel may be all-or-nothing (e.g., there will be no partial PUSCH transmission in frequency domain, unlike a partial downlink channel that can be transmitted for downlink communications).

A reference duration 405 used for determining to adjust a contention window size for an uplink LBT as shown in reference duration configuration 400 may begin at the beginning of channel occupancy. The reference duration 405 may then end at the earlier of an end of a slot 410 where at least one uplink channel (e.g., PUSCH) is transmitted or an end of a transmission burst by the wireless device that contains the uplink channel (e.g., PUSCH(s)) is transmitted (e.g., the end of the transmission burst may be used if the uplink burst ends before the first slot boundary). For example, a first reference duration 405-*a* may begin at the beginning of the channel occupancy and end at an ending of a slot 410 with a full uplink channel transmitted before the end of the slot 410 (e.g., in a single slot, across multiple slots, etc.). Additionally or alternatively, a reference duration 405-*b* may also begin at the beginning of the channel occupancy but end at an ending of a transmission burst that includes a full uplink channel transmitted.

Additionally or alternatively, a wireless device (e.g., a base station 105, a DU component of an IAB node, etc.) may use reference duration configuration 401 for contention window adjustment to access unlicensed resources for downlink transmissions. In some implementations, the reference durations 415 shown in reference duration configuration 401 may be used for downlink LBT procedures with unicast downlink channels (e.g., physical downlink shared channels (PDSCHs)). These reference durations 415 for contention window size adjustments for downlink LBT procedures may be maintained per LBT bandwidth. The determination of the reference durations 415 for the downlink LBT procedures may be more complicated than the uplink LBT procedures because the unicast downlink channel transmissions can be punctured if part of the downlink channel transmissions that fall in an LBT bandwidth fail the downlink LBT procedure.

The reference durations 415 used for determining to adjust a contention window size for a downlink LBT as shown in reference duration configuration 401 may begin at the beginning of channel occupancy. The reference durations 415 may then end at the earlier of an end of a slot 410 where at least one unicast downlink channel (e.g., PDSCH) is fully transmitted or the end of a first transmission burst by the wireless device that contains unicast downlink channel(s) fully transmitted (e.g., the end of the transmission burst may be used if the downlink burst ends before the first slot boundary). For example, a reference duration 415-*a* may begin at the beginning of the channel occupancy and end at an ending of a slot 410 with a full downlink channel transmitted before the end of the slot 410 (e.g., in a single slot, across multiple slots, etc.), where some of the downlink channels may be punctured. Additionally or alternatively, a reference duration 415-*b* may also begin at the beginning of the channel occupancy but end at an ending of a transmission burst that includes a full downlink channel transmitted, where some of the downlink channels may be punctured. In some implementations, if a channel occupancy has a unicast downlink channel but does not have any unicast downlink channels transmitted over all the resources allocated for that downlink channel, then the duration of a transmission burst by the wireless device within the channel occupancy that contains unicast downlink channel(s) may be used as the reference duration for a contention window size adjustment.

Subsequently, after the different reference durations are determined, a wireless device may use different types of feedback or indicators identified during the different reference durations to then adjust a contention window size. For example, when a downlink channel (e.g., PDSCH) is confined within a single LBT bandwidth and for a transport block-based HARQ feedback configuration within a single LBT subband, the wireless device may reset the contention window if at least one positive acknowledgment (e.g., ACK) is received (e.g., for the downlink channel). Additionally or alternatively, when an uplink channel (e.g., PUSCH) is confined within a single LBT bandwidth and for a transport block-based HARQ feedback configuration within a single LBT subband, the wireless device may reset the contention window if at least one NDI is toggled for the transport block(s) transmitted in the reference duration. In some cases, HARQ feedback may include any implicit methods of HARQ feedback determination.

Additionally or alternatively, for adjusting a contention window for an LBT procedure to transmit downlink messages and for CBG based HARQ feedback within a single LBT subband and when all CBGs are confined within the LBT subband, the wireless device may reset the contention window if positive acknowledgment messages are received for at least 10% of the CBGs in the reference duration. For adjusting a contention window for an LBT procedure to transmit uplink messages and for CBG based HARQ feedback within a single LBT subband and when all CBGs are confined within the LBT subband, for the purpose of contention window size adjustment, a CBG transmission indicator (TI) set to a specific value (e.g., '0') may be assumed to be a positive acknowledgment, and the wireless device may reset the contention window based on the CBGTI being set to the value. Additionally or alternatively, for a downlink transmission burst without a unicast downlink channel (e.g., PDSCH) but does include one or more uplink grants, a contention window size adjustment may be based on a success or failure of reception of uplink channel (e.g., PUSCH) transmissions via the granted resources indicated in the uplink grant(s).

Figure 5:
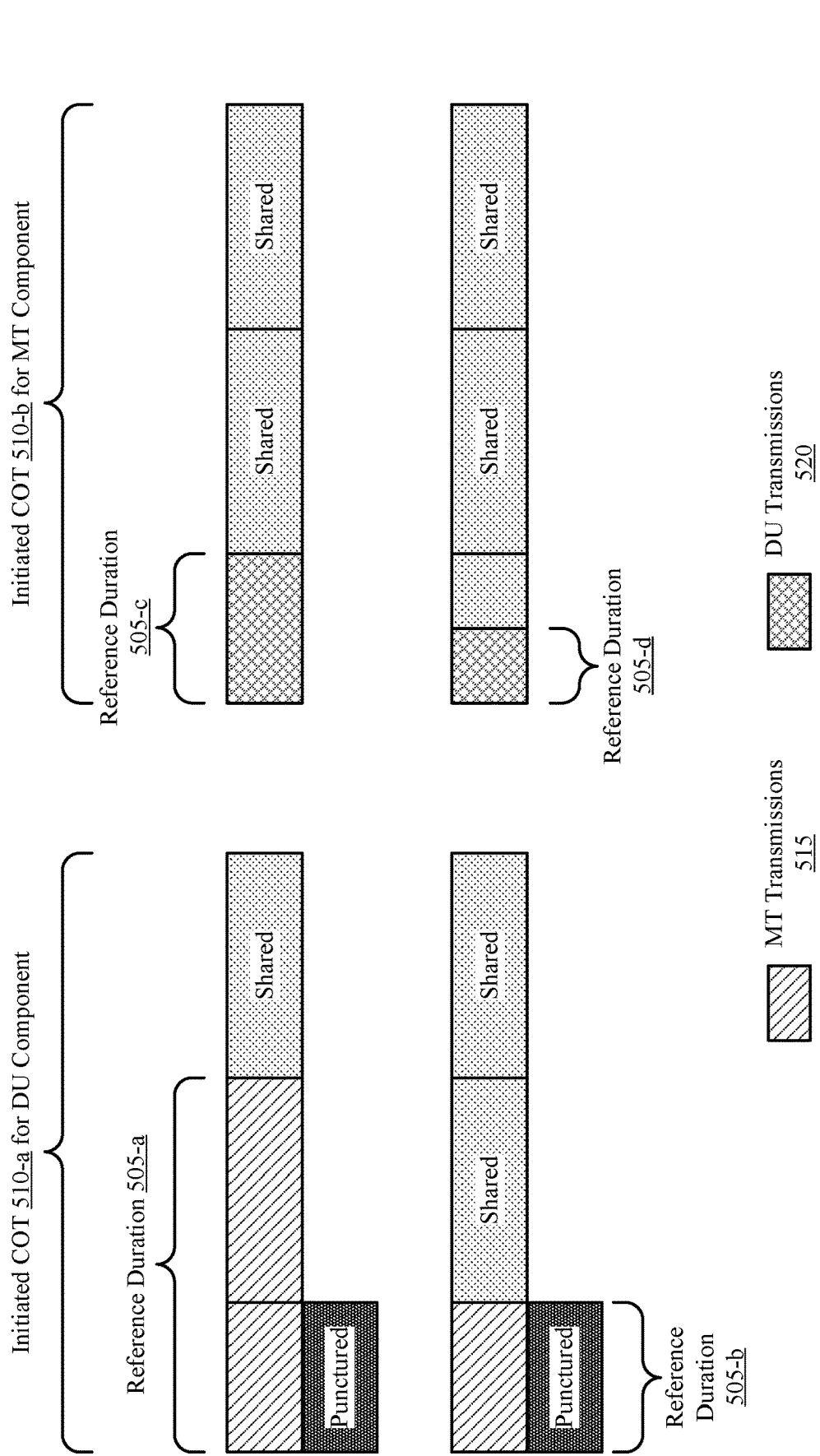
FIGS. 5, 6, and 7 illustrates an examples of reference duration configurations that support contention window updates with IAB nodes for unlicensed operations in accordance with aspects of the present disclosure.

FIG. 5 illustrates an example of a reference duration configuration 500 that supports contention window updates with IAB nodes for unlicensed operations in accordance with aspects of the present disclosure. Reference duration configuration 500 may implement aspects of wireless communications systems 100 and 200. For example, an IAB node may use reference duration configuration 500 to determine one or more reference durations 505 for adjusting or updating a contention window for LBT procedures performed for an MT component of the IAB node (e.g., a first component) and a DU component of the IAB node (e.g., a second component).

As described herein, the IAB node may use reference duration configuration 500 to perform separate contention window updates based on separate COTs for the MT component and for the DU component on the IAB node. For example, the IAB node may have a first initiated COT 510-*a* for the DU component and a second initiated COT 510-*b* for the MT component. The first initiated COT 510-*a* for the DU component may then include either a reference duration 505-*a* or a reference duration 505-*b* depending on when the reference duration ends based on when the IAB node fully transmits a downlink message (e.g., fully transmitted PDSCH) as described with reference to FIG. 4B. Similarly, the second initiated COT 510-*b* for the MT component may include either a reference duration 505-*c* or a reference duration 505-*d* depending on when the reference duration ends based on when the IAB node transmits an uplink message (e.g., partially or fully) as described with reference to FIG. 4A. Additionally, the two initiated COTs 510 may occur based on a TDM configuration (e.g., on a same set of unlicensed resources but at different times).

The contention window update on the MT component may follow the techniques described with reference to FIG. 4A and the feedback or indicators described for uplink LBT procedures (e.g., a triggered NDI, CBGTI set to a specific value, etc.). For example, the feedback or indicators identified to adjust a contention window for the MT component may be based on one or more MT transmissions 515 that occur during the reference duration 505-*c* or the reference duration 505-*d*. Additionally, the contention window update on the DU component may follow the techniques described with reference to FIG. 4B and the feedback or indicators described for downlink LBT procedures (e.g., HARQ acknowledgment feedback, a percentage of HARQ acknowledgment feedback messages satisfying a threshold for a set of CBGs, successfully receiving an uplink message on resources indicated by an uplink grant, etc.). For example, the feedback or indicators identified to adjust a contention window for the DU component may be based on one or more DU transmissions 520 that occur during the reference duration 505-*a* or the reference duration 505-*b*.

In some implementations, the reference durations for contention window updates for either the MT component or the DU component may apply to the COT initiated by either the MT component or the DU component. For example, the IAB node may perform any contention window updates for the DU component alone during the first initiated COT 510-*a* based on any feedback or indicators for downlink LBT procedures during the reference duration 505-*a* or the reference duration 505-*b*. Additionally or alternatively, the IAB node may perform any contention window updates for the MT component alone during the second initiated COT 510-*b* based on any feedback or indicators for uplink LBT procedures during the reference duration 505-*c* or the reference duration 505-*d*. That is, the COT initiated by the DU component (e.g., the first initiated COT 510-*a*) may be used for contention window updates for the DU component, while the COT initiated by the MT component (e.g., the second initiated COT 510-*b*) may be used for contention window updates for the MT component.

When a COT is shared between the DU component and MT component, the reference duration may apply to either the MT transmissions 515 or the DU transmissions 520. For the DU component or the MT component for the shared COT, the reference duration 505 may be defined as the end of a slot where at least one PDSCH or PUSCH is transmitted or the end of a transmission burst by the DU component or the MT component that contains PDSCH(s) or PUSCH(s) transmitted.

Figure 6:
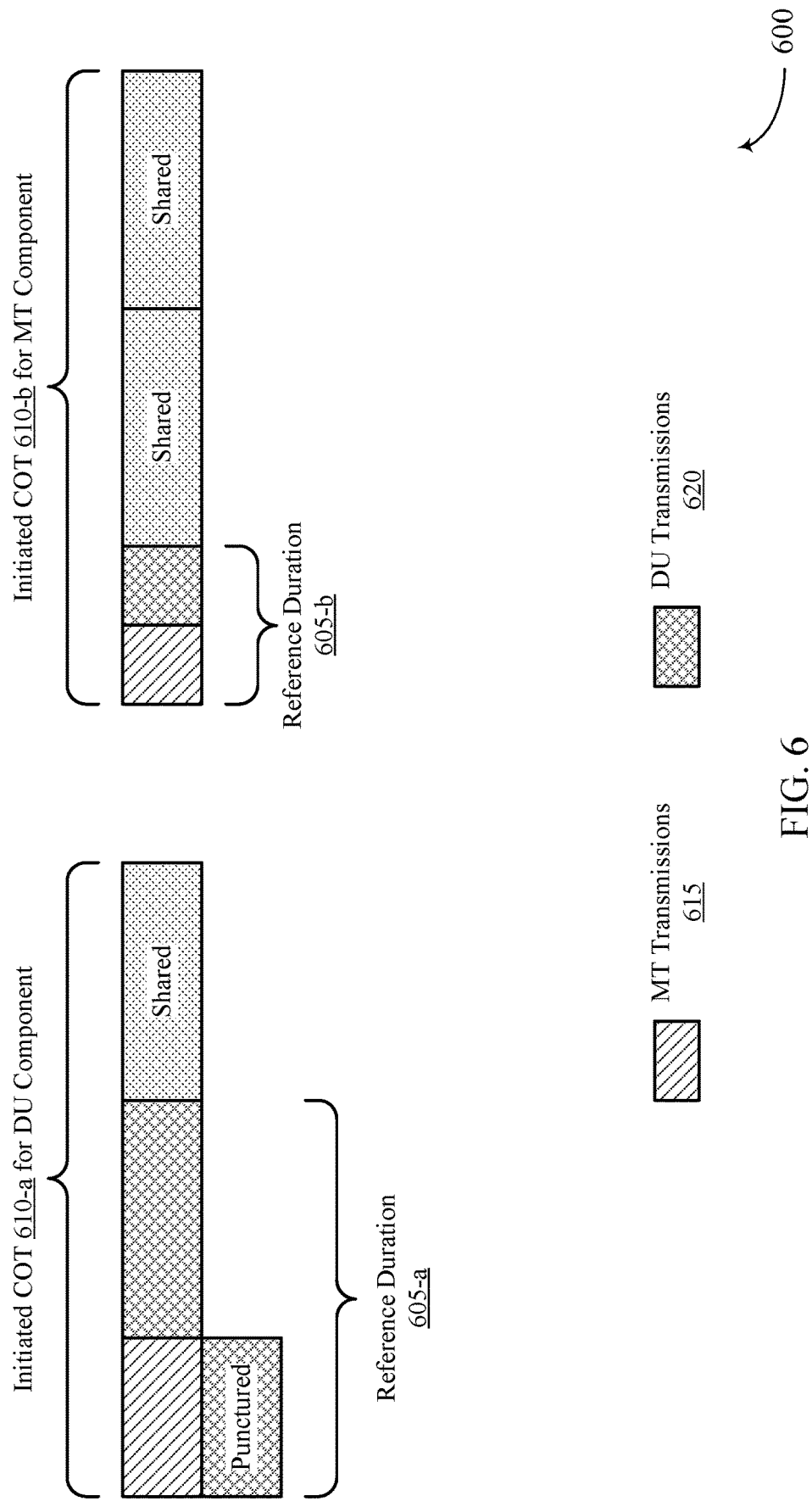

FIG. 6 illustrates an example of a reference duration configuration 600 that supports contention window updates with IAB nodes for unlicensed operations in accordance with aspects of the present disclosure. Reference duration configuration 600 may implement aspects of wireless communications systems 100 and 200. For example, an IAB node may use reference duration configuration 600 to determine one or more reference durations 605 for adjusting or updating a contention window for LBT procedures performed for an MT component of the IAB node (e.g., a first component) and a DU component of the IAB node (e.g., a second component).

As described herein, the IAB node may use reference duration configuration 600 to perform a joint contention window update for the MT component and the DU component on the IAB node. For this joint contention window update, a reference duration 605 may be defined to include a duration with both MT transmissions 615 and DU transmissions 620. For example, the IAB node may use a first reference duration 605-a or a second reference duration 605-b that is defined with a start of a channel occupancy for either a first initiated COT 610-a for the DU component or a second initiated COT 610-b for the MT component and with an end of a slot where at least one downlink channel (e.g., PDSCH) or uplink channel (e.g., PUSCH) is transmitted or an end of a transmission burst by the DU component or the MT component that contains downlink channels (e.g., PDSCH(s)) or uplink channels (e.g., PUSCH(s)) transmitted. That is, a joint or single reference duration 605 may be defined for the MT component and the DU component. Additionally, the two initiated COTs 610 may occur based on a TDM configuration.

Additionally, the reference duration 605 may happen in either the first initiated COT 610-a for the DU component or the second initiated COT 610-b for the MT component for the IAB node to update contention windows for both the MT component and the DU component. The feedback or indications identified by the IAB node during the reference durations 605 that are used to determine to update both contention windows may include the feedback or indications for the MT transmissions 615 (e.g., feedback or indications used for updating contention windows for uplink LBT procedures as described with reference to FIGS. 4A and 4B) as well as feedback or indications for the DU transmissions 620 (e.g., feedback or indications used for updating contention windows for downlink LBT procedures as described with reference to FIGS. 4A and 4B). That is, feedback or indications used for updating contention windows for either the MT component or the DU component that are identified during the joint/single reference duration 605 may result in the IAB node adjusting the contention windows for both the MT component and for the DU component.

Figure 7:
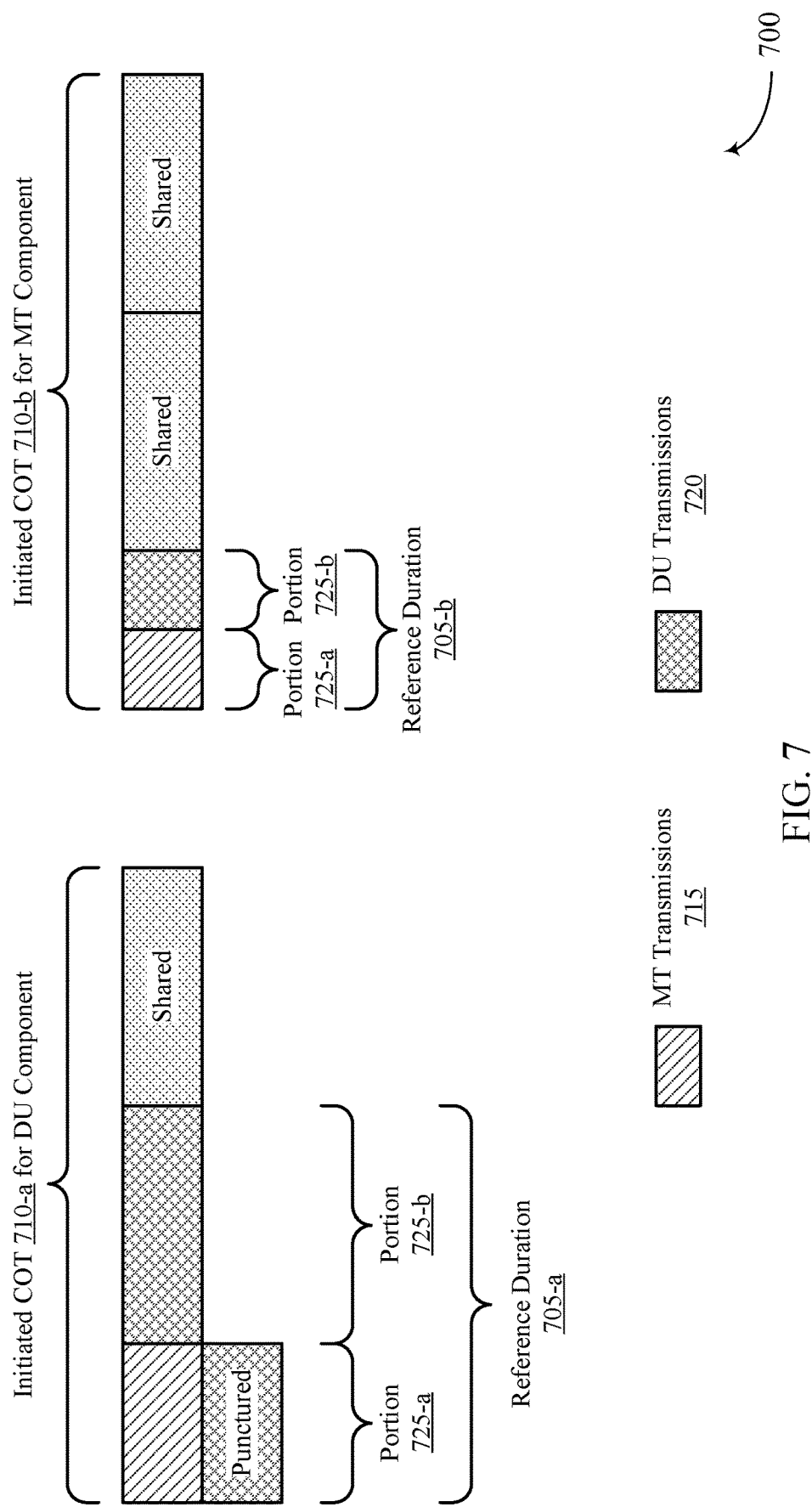

FIG. 7 illustrates an example of a reference duration configuration 700 that supports contention window updates with IAB nodes for unlicensed operations in accordance with aspects of the present disclosure. Reference duration configuration 600 may implement aspects of wireless communications systems 100 and 200. For example, an IAB node may use reference duration configuration 700 to determine one or more reference durations 705 for adjusting or updating a contention window for LBT procedures performed for an MT component of the IAB node (e.g., a first component) and a DU component of the IAB node (e.g., a second component).

As described herein, the IAB node may use reference duration configuration 700 to perform separate contention window updates based on a same COT for the MT component and the DU component on the IAB node. That is, the IAB node may perform separate contention window updates for the MT component and the DU component based on a reference duration 705 that includes both MT transmissions 715 and DU transmissions 720 in a same COT. The separate contention window updates using a single reference duration may combine techniques as described with reference to FIGS. 5 and 6. For example, the reference duration 705 may start with a channel occupancy for either a first initiated COT 710-a for the DU component or a second initiated COT 710-b for the MT component and may end with an end of a slot where at least one downlink channel (e.g., PDSCH) or uplink channel (e.g., PUSCH) is transmitted or an end of a transmission burst by the DU component or the MT component that contains downlink channels (e.g., PDSCH(s)) or uplink channels (e.g., PUSCH(s)) transmitted. That is, a joint or single reference duration 705 may be defined for the MT component and the DU component. Additionally, the two initiated COTs 710 may occur based on a TDM configuration.

However, the feedback or indications for either the DU component or the MT component may be used separately for contention window updates for the DU component and the for the MT component. That is, feedback or indications that correspond to the MT transmissions 715 (e.g., feedback or indications used for updating contention windows for uplink LBT procedures as described with reference to FIGS. 4A and 4B) may be used to update the contention windows for the MT component alone, and feedback or indications that correspond to the DU transmissions 720 (e.g., feedback or indications used for updating contention windows for uplink LBT procedures as described with reference to FIGS. 4A and 4B) may be used to update the contention windows for the DU component alone.

These separate contention window updates may occur even though both the MT transmissions 715 and the DU transmissions 720 into a reference duration 705 within a same initiated COT 710. For example, a first reference duration 705-a or a second reference duration 705-b may include a first portion 725-a for the MT transmissions 715 and a second portion 725-b for the DU transmissions 720. However, the IAB node may update contention windows for the MT component based on feedback or indications identified for the MT transmissions 715 in the first portion 725-a during one of the reference durations 705 and may update contention windows for the DU component based on feedback or indication identified for the DU transmissions 720 in the second portion 725-b during one of the reference durations 705. That is, feedback or indications for the MT transmissions 715 may not be used to update contention windows for the DU component and vice versa.

Figure 8:
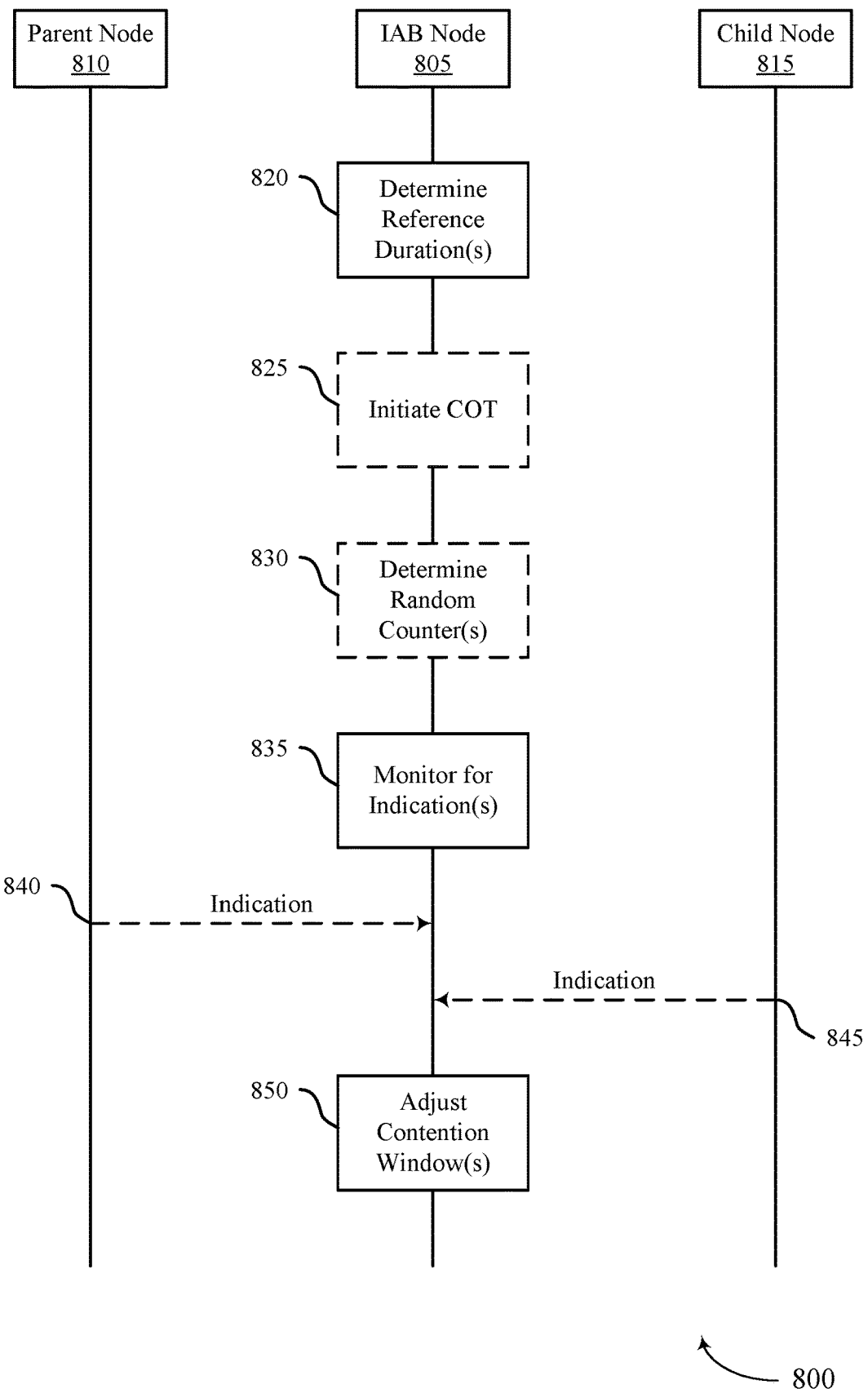
FIG. 8 illustrates an example of a process flow that supports contention window updates with IAB nodes for unlicensed operations in accordance with aspects of the present disclosure.

FIG. 8 illustrates an example of a process flow 800 that supports contention window updates with IAB nodes for unlicensed operations in accordance with aspects of the present disclosure. Process flow 800 may implement aspects of wireless communications systems 100 and 200. For example, process flow 800 may include an IAB node 805, a parent node 810, and a child node 815. The IAB node 805 may include a first component (e.g., an MT component) that communicates with at least the parent node 810 and a second component (e.g., a DU component) that communicates with at least the child node 815. In some implementations, the parent node 810 may be a base station, an additional IAB node, or another type of network device, and the child node may be a UE, an additional IAB node, or another type of receiving device. As such, the first component of the IAB node 805 may transmit uplink messages to the parent node 810, and the second component of the IAB node 805 may transmit downlink messages to the child node 815.

In the following description of the process flow 800, the operations between the IAB node 805, the parent node 810, and the child node 815 may be transmitted in a different order than the exemplary order shown, or the operations performed by the IAB node 805, the parent node 810, and the child node 815 may be performed in different orders or at different times. Certain operations may also be left out of the process flow 800, or other operations may be added to the process flow 800. It is to be understood that while the IAB node 805, the parent node 810, and the child node 815 are shown performing a number of the operations of process flow 800, any wireless device may perform the operations shown.

At 820, the IAB node 805 may determine a first reference duration for the first component and a second reference duration for the second component (e.g., as described with reference to FIG. 5). In some implementation, the IAB node 805 may determine an overall reference duration for the IAB node 805 that includes a first portion for the first reference duration and a second portion for the second reference duration (e.g., as described with reference to FIG. 7). For example, the IAB node 805 may determine a starting point for the first reference duration and an ending point for the first reference duration and may determine a starting point for the second reference duration and an ending point for the second reference duration. The starting point for the first reference duration and for the second reference duration may include a start of a channel occupancy initiated by the first component, the second component, or for either component (e.g., for the overall reference duration). Additionally, the ending point for the first reference duration may include a slot boundary where at least one uplink channel is transmitted or an end of a transmission burst that contains a transmitted uplink channel. Additionally or alternatively, the ending point for the second reference duration may include a slot boundary where at least one downlink channel is fully transmitted or an end of a transmission burst that contains a fully transmitted downlink channel.

In some implementations, the IAB node 805 may determine a reference duration for the first component and the second component (e.g., as described with reference to FIG. 6). For example, the IAB node 805 may determine a starting point for the reference duration and an ending point for the reference duration. The starting point for the reference duration may include a start of a channel occupancy initiated by the first component or by the second component. Additionally, the ending point for the reference duration may include a slot boundary where at least one downlink channel is fully transmitted, an end of a transmission burst that contains a fully transmitted downlink channel, a slot boundary where at least one uplink channel is transmitted, or an end of a transmission burst that contains a transmitted uplink channel.

At 825, the IAB node 805 may initiate a COT by the first component, may initiate a COT by the second component, or both (e.g., for the separate reference durations). Additionally or alternatively, the IAB node 805 may initiate a COT by the first component or by the second component (e.g., for the single reference duration).

At 830, the IAB node 805 may determine a first random counter for a first channel access procedure for the first component and a second random counter for a second channel access procedure for the second component. The first random counter may be used for a COT initiated by the first component and may be based on a first contention window for the first component. Additionally or alternatively, the second random counter may be used for a COT initiated by the second component and may be based on a second contention window for the second component. In some implementations, the IAB node 805 may determine a joint random counter for a first channel access procedure for the first component and second channel access procedure for the second component. Accordingly, the joint random counter may be based on a maximum contention window size, a minimum contention window size, an average contention window size, or an additional function of the first contention window and the second contention window.

At 835, the IAB node 805 may monitor for a first indication during the first reference duration to update a first contention window for the first component and for a second indication during the second reference duration to update a second contention window for the second component. With the overall reference duration, the IAB node 805 may monitor for the first indication during the first portion of the overall reference duration and for the second indication during the second portion of the overall reference duration. In some implementations, the first indication may include an NDI for a message transmitted during the first reference duration, a value of a CBGTI field for a CBG transmitted during the first reference duration, or a combination thereof. Additionally or alternatively, the second indication may include an acknowledgment message received during the second reference duration, an amount of acknowledgment messages that exceeds a threshold value received during the second reference duration, successfully receiving an uplink channel on granted resources during the second reference duration, or a combination thereof.

Additionally or alternatively, for the single reference duration (e.g., for joint contention window updates), the IAB node 805 may monitor for an indication during the reference duration to update the first contention window for the first component and the second contention window for the second component. Accordingly, the indication may include the first indication or the second indication as described previously, where the indication is then used to update both the first contention window and the second contention window.

At 840, the IAB node 805 may receive or identify an indication from the parent node 810. For example, the indication received or identified from the parent node 810 may include feedback or indications used to update contention windows for uplink LBT procedures, such as the NDI for a message transmitted during the first reference duration, a value of a CBGTI field for a CBG transmitted during the first reference duration, or a combination thereof.

At 845, the IAB node 805 may receive or identify an indication from the child node 815. For example, the indication received or identified from the child node 815 may include feedback or indications used to update contention windows for downlink LBT procedures, such as an acknowledgment message received during the second reference duration, an amount of acknowledgment messages that exceeds a threshold value received during the second reference duration, successfully receiving an uplink channel on granted resources during the second reference duration, or a combination thereof.

At 850, the IAB node 805 may adjust at least one of the first contention window and the second contention window based on the monitoring for the first indication and the second indication. For example, when the COT is initiated by the first component, the first contention window may be determined to be adjusted for the COT based on the monitoring for the first indication, and the IAB node 805 may refrain from adjusting the second contention window based on the monitoring for the first indication. Additionally or alternatively, when the COT is initiated by the second component, the second contention window may be determined to be adjusted for the COT based on the monitoring for the second indication, and the IAB node 805 may refrain from adjusting the first contention window based on the monitoring for the second indication.

Additionally or alternatively, for the single reference duration (e.g., and for joint contention window updates), the IAB node 805 may adjust the first contention window and the second contention window based on the monitoring. For example, the first contention window and the second contention window may be both determined to be adjusted for the COT based on the monitoring for the indication.

Figure 9:
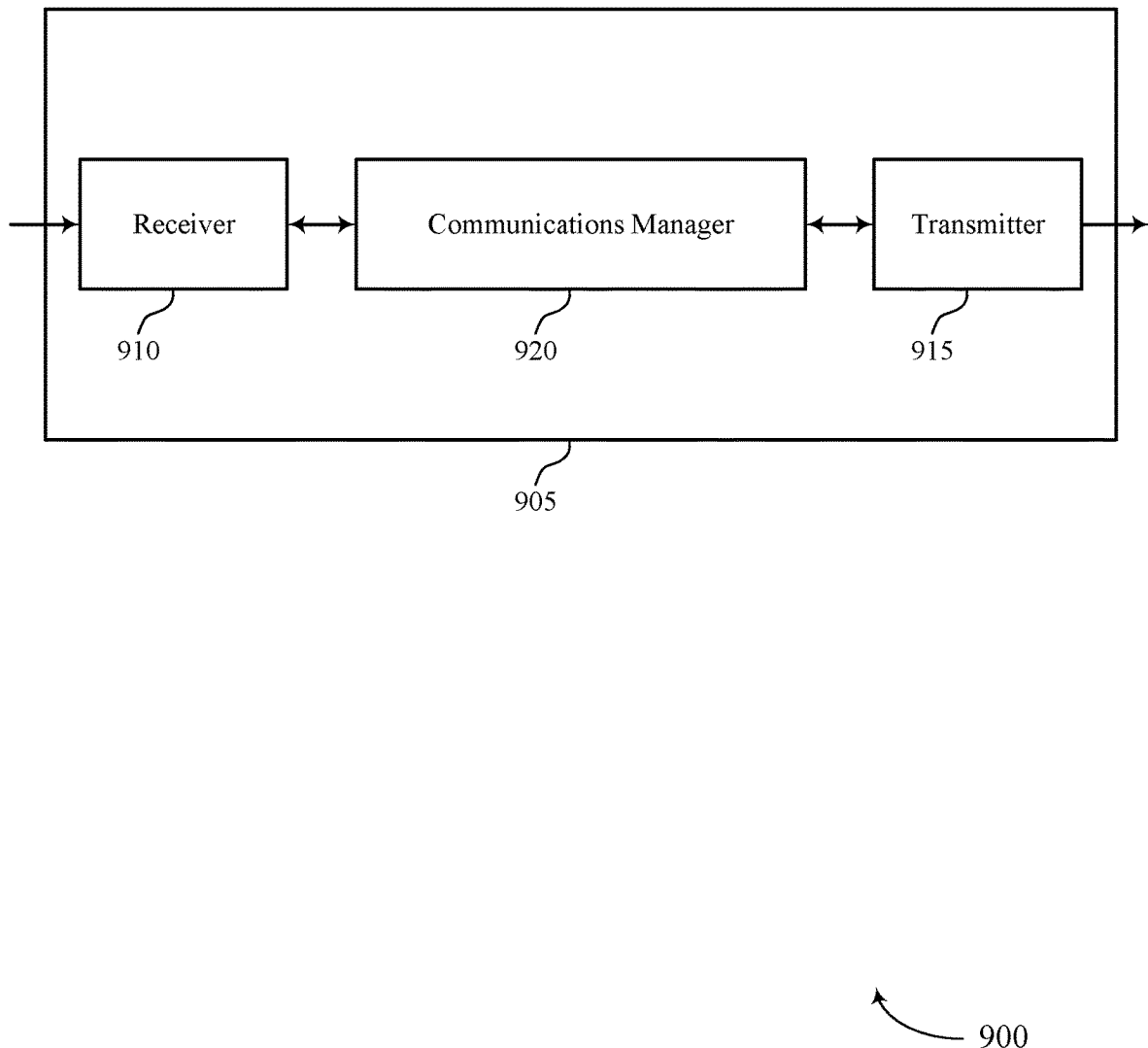
FIGS. 9 and 10 show block diagrams of devices that support contention window updates with IAB nodes for unlicensed operations in accordance with aspects of the present disclosure.

FIG. 9 shows a block diagram 900 of a device 905 that supports contention window updates with IAB nodes for unlicensed operations in accordance with aspects of the present disclosure. The device 905 may be an example of aspects of an IAB node, a UE 115 (e.g., DU component), or a base station 105 (e.g., MT component) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to contention window updates with IAB nodes for unlicensed operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to size-based neural network selection for autoencoder-based communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of contention window updates with IAB nodes for unlicensed operations as described herein.

In some examples, the communications manager 920, the receiver 910, the transmitter 915, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 920, the receiver 910, the transmitter 915, or various combinations thereof or components thereof, may be implemented in code (e.g., as communications management software or firmware) executed by a processor. If implemented in code executed by a processor, the functions of the communications manager 920, the receiver 910, the transmitter 915, or various combinations thereof or components thereof, may be executed by a general-purpose processor, a DSP, a central processing unit (CPU), an ASIC, an FPGA, or any combination of these or other programmable logic devices.

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at an IAB node including a first component for communications with at least a parent node and a second component for communications with at least a child node in accordance with examples as disclosed herein. For example, the communications manager 920 may be configured to provide or support a means for determining a first reference duration for the first component and a second reference duration for the second component. The communications manager 920 may be configured to provide or support a means for monitoring for a first indication during the first reference duration to update a first contention window for the first component and for a second indication during the second reference duration to update a second contention window for the second component. The communications manager 920 may be configured to provide or support a means for adjusting at least one of the first contention window and the second contention window based on the monitoring for the first indication and the second indication.

Additionally or alternatively, the communications manager 920 may support wireless communications at an IAB node including a first component for communications with at least a parent node and a second component for communications with at least a child node in accordance with examples as disclosed herein. For example, the communications manager 920 may be configured to provide or support a means for determining a reference duration for the first component and the second component. The communications manager 920 may be configured to provide or support a means for monitoring for an indication during the reference duration to update a first contention window for the first component and a second contention window for the second component. The communications manager 920 may be configured to provide or support a means for adjusting the first contention window and the second contention window based on the monitoring.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources. For example, the separate or joint reference durations may enable the IAB node to attempt to access a same set of unlicensed resources for both the first component and the second component.

Figure 10:
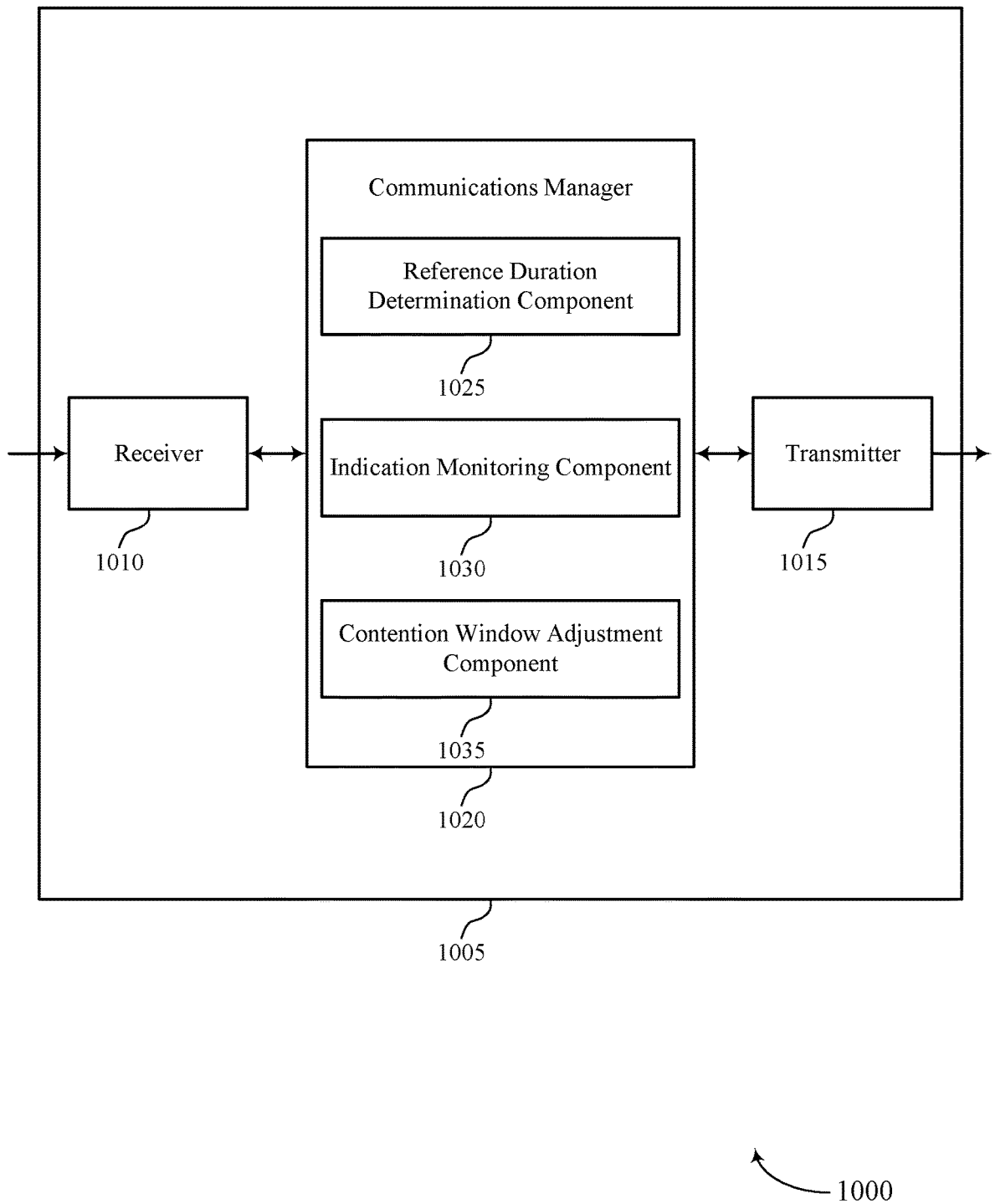

FIG. 10 shows a block diagram 1000 of a device 1005 that supports contention window updates with IAB nodes for unlicensed operations in accordance with aspects of the present disclosure. The device 1005 may be an example of aspects of a device 905, an IAB node, a UE 115 (e.g., DU component), or a base station 105 (e.g., MT component) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to contention window updates with IAB nodes for unlicensed operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of contention window updates with IAB nodes for unlicensed operations as described herein. For example, the communications manager 1020 may include a reference duration determination component 1025, an indication monitoring component 1030, a contention window adjustment component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at an IAB node including a first component for communications with at least a parent node and a second component for communications with at least a child node in accordance with examples as disclosed herein. The reference duration determination component 1025 may be configured to provide or support a means for determining a first reference duration for the first component and a second reference duration for the second component. The indication monitoring component 1030 may be configured to provide or support a means for monitoring for a first indication during the first reference duration to update a first contention window for the first component and for a second indication during the second reference duration to update a second contention window for the second component. The contention window adjustment component 1035 may be configured to provide or support a means for adjusting at least one of the first contention window and the second contention window based on the monitoring for the first indication and the second indication.

Additionally or alternatively, the communications manager 1020 may support wireless communications at an IAB node including a first component for communications with at least a parent node and a second component for communications with at least a child node in accordance with examples as disclosed herein. The reference duration determination component 1025 may be configured to provide or support a means for determining a reference duration for the first component and the second component. The indication monitoring component 1030 may be configured to provide or support a means for monitoring for an indication during the reference duration to update a first contention window for the first component and a second contention window for the second component. The contention window adjustment component 1035 may be configured to provide or support a means for adjusting the first contention window and the second contention window based on the monitoring.

Figure 11:
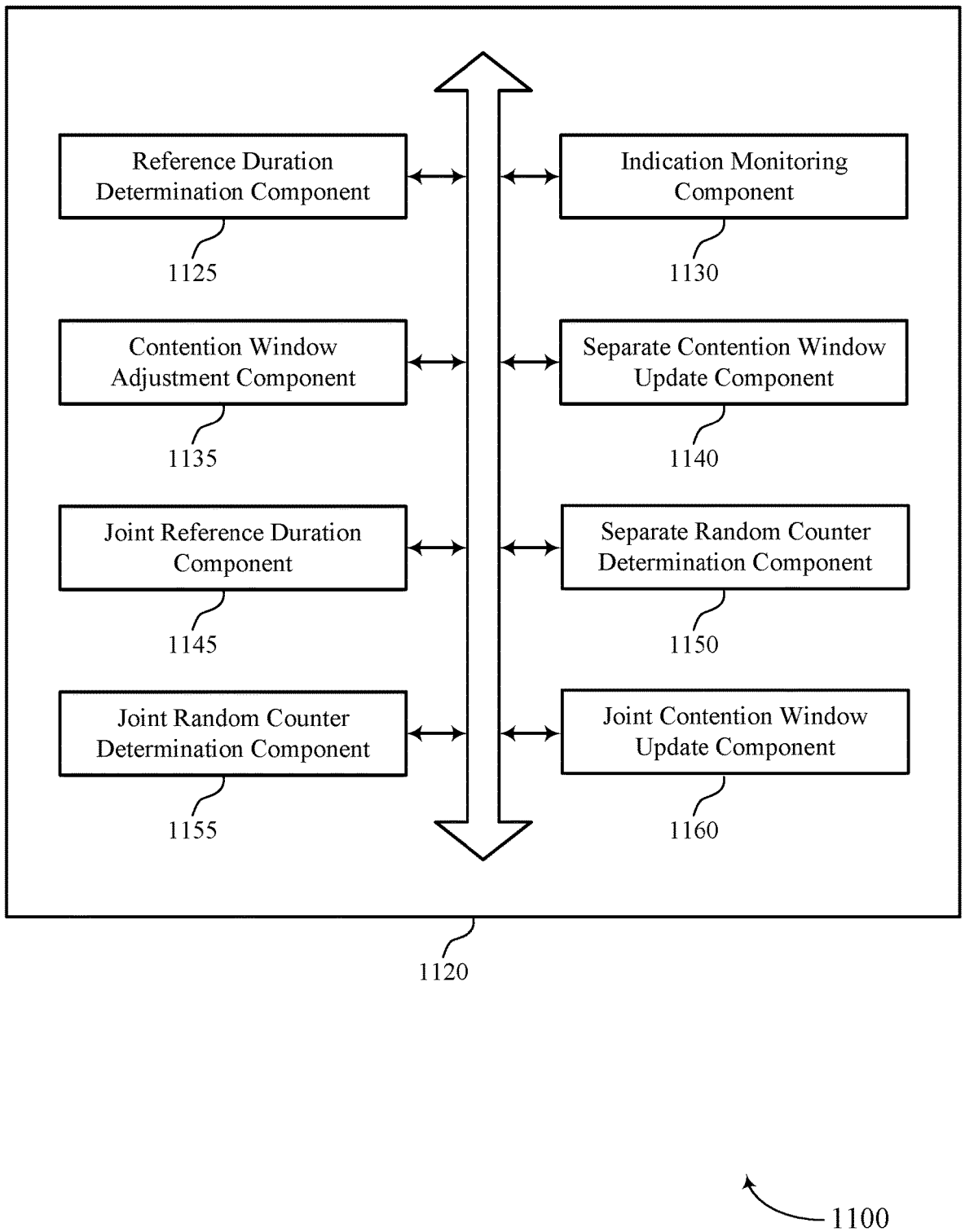
FIG. 11 shows a block diagram of a communications manager that supports contention window updates with IAB nodes for unlicensed operations in accordance with aspects of the present disclosure.

FIG. 11 shows a block diagram 1100 of a communications manager 1120 that supports contention window updates with IAB nodes for unlicensed operations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of contention window updates with IAB nodes for unlicensed operations as described herein. For example, the communications manager 1120 may include a reference duration determination component 1125, an indication monitoring component 1130, a contention window adjustment component 1135, a separate contention window update component 1140, a joint reference duration component 1145, a separate random counter determination component 1150, a joint random counter determination component 1155, a joint contention window update component 1160, or any combination thereof. Each of these components may communicate, directly or indirectly, with one another (e.g., via one or more buses).

The communications manager 1120 may support wireless communications at an IAB node including a first component for communications with at least a parent node and a second component for communications with at least a child node in accordance with examples as disclosed herein. The reference duration determination component 1125 may be configured to provide or support a means for determining a first reference duration for the first component and a second reference duration for the second component. The indication monitoring component 1130 may be configured to provide or support a means for monitoring for a first indication during the first reference duration to update a first contention window for the first component and for a second indication during the second reference duration to update a second contention window for the second component. The contention window adjustment component 1135 may be configured to provide or support a means for adjusting at least one of the first contention window and the second contention window based on the monitoring for the first indication and the second indication.

In some examples, the separate contention window update component 1140 may be configured to provide or support a means for initiating a channel occupancy time by the first component, where the first contention window is determined to be adjusted for the channel occupancy time based on the monitoring for the first indication.

In some examples, the separate contention window update component 1140 may be configured to provide or support a means for refraining from adjusting the second contention window based on the monitoring for the first indication.

In some examples, the separate contention window update component 1140 may be configured to provide or support a means for initiating a channel occupancy time by the second component, where the second contention window is determined to be adjusted for the channel occupancy time based on the monitoring for the second indication.

In some examples, the separate contention window update component 1140 may be configured to provide or support a means for refraining from adjusting the first contention window based on the monitoring for the second indication.

In some examples, to support determining the first reference duration for the first component and the second reference duration for the second component, the joint reference duration component 1145 may be configured to provide or support a means for determining an overall reference duration for the IAB node that includes a first portion for the first reference duration and a second portion for the second reference duration. In some examples, to support determining the first reference duration for the first component and the second reference duration for the second component, the joint reference duration component 1145 may be configured to provide or support a means for monitoring for the first indication during the first portion of the overall reference duration and for the second indication during the second portion of the overall reference duration.

In some examples, the separate random counter determination component 1150 may be configured to provide or support a means for determining a first random counter for a first channel access procedure for the first component and a second random counter for a second channel access procedure for the second component.

In some examples, the first random counter is used for a channel occupancy time initiated by the first component and is based on the first contention window for the first component.

In some examples, the second random counter is used for a channel occupancy time initiated by the second component and is based on the second contention window for the second component.

In some examples, the joint random counter determination component 1155 may be configured to provide or support a means for determining a joint random counter for a first channel access procedure for the first component and second channel access procedure for the second component.

In some examples, the joint random counter is based on a maximum contention window size, a minimum contention window size, an average contention window size, or an additional function of the first contention window and the second contention window.

In some examples, to support determining the first reference duration for the first component, the reference duration determination component 1125 may be configured to provide or support a means for determining a starting point for the first reference duration and an ending point for the first reference duration.

In some examples, the starting point for the first reference duration includes a start of a channel occupancy initiated by the first component.

In some examples, the ending point for the first reference duration includes a slot boundary where at least one uplink channel is transmitted or an end of a transmission burst that contains a transmitted uplink channel.

In some examples, to support determining the second reference duration for the second component, the reference duration determination component 1125 may be configured to provide or support a means for determining a starting point for the second reference duration and an ending point for the second reference duration.

In some examples, the starting point for the second reference duration includes a start of a channel occupancy initiated by the second component.

In some examples, the ending point for the second reference duration includes a slot boundary where at least one downlink channel is fully transmitted or an end of a transmission burst that contains a fully transmitted downlink channel.

In some examples, the first indication includes a new data indicator for a message transmitted during the first reference duration, a value of a code block group transmission information field for a code block group transmitted during the first reference duration, or a combination thereof.

In some examples, the second indication includes an acknowledgment message received during the second reference duration, an amount of acknowledgment messages that exceeds a threshold value received during the second reference duration, successfully receiving an uplink channel on granted resources during the second reference duration, or a combination thereof.

Additionally or alternatively, the communications manager 1120 may support wireless communications at an IAB node including a first component for communications with at least a parent node and a second component for communications with at least a child node in accordance with examples as disclosed herein. In some examples, the reference duration determination component 1125 may be configured to provide or support a means for determining a reference duration for the first component and the second component. In some examples, the indication monitoring component 1130 may be configured to provide or support a means for monitoring for an indication during the reference duration to update a first contention window for the first component and a second contention window for the second component. In some examples, the contention window adjustment component 1135 may be configured to provide or support a means for adjusting the first contention window and the second contention window based on the monitoring.

In some examples, the joint contention window update component 1160 may be configured to provide or support a means for initiating a channel occupancy time by the first component or by the second component, where the first contention window and the second contention window are determined to be adjusted for the channel occupancy time based on the monitoring for the indication.

In some examples, the separate random counter determination component 1150 may be configured to provide or support a means for determining a first random counter for a first channel access procedure for the first component and a second random counter for a second channel access procedure for the second component.

In some examples, the first random counter is used for a channel occupancy time initiated by the first component and is based on the first contention window for the first component.

In some examples, the second random counter is used for a channel occupancy time initiated by the second component and is based on the second contention window for the second component.

In some examples, the joint random counter determination component 1155 may be configured to provide or support a means for determining a joint random counter for a first channel access procedure for the first component and second channel access procedure for the second component.

In some examples, the joint random counter is based on a maximum contention window size, a minimum contention window size, an average contention window size, or an additional function of the first contention window and the second contention window.

In some examples, to support determining the reference duration, the reference duration determination component 1125 may be configured to provide or support a means for determining a starting point for the reference duration and an ending point for the reference duration.

In some examples, the starting point for the reference duration includes a start of a channel occupancy initiated by the first component or by the second component.

In some examples, the ending point for the reference duration includes a slot boundary where at least one downlink channel is fully transmitted, an end of a transmission burst that contains a fully transmitted downlink channel, a slot boundary where at least one uplink channel is transmitted, or an end of a transmission burst that contains a transmitted uplink channel.

In some examples, the indication includes a new data indicator for a message transmitted during the first reference duration, a value of a code block group transmission information field for a code block group transmitted during the first reference duration, an acknowledgment message received during the second reference duration, an amount of acknowledgment messages that exceeds a threshold value received during the second reference duration, successfully receiving an uplink channel on granted resources during the second reference duration, or a combination thereof.

Figure 12:
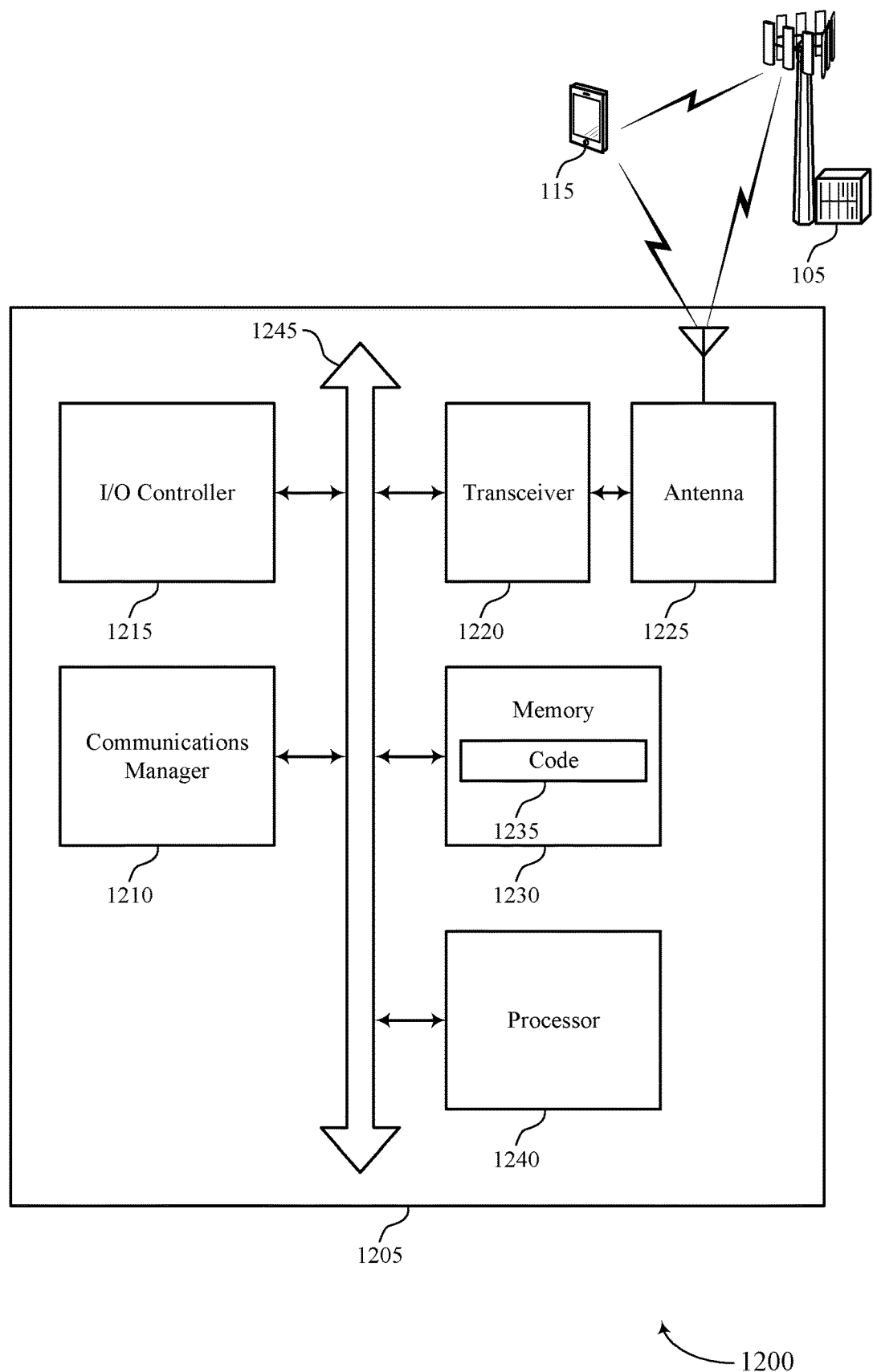
FIG. 12 shows a diagram of a system including a user equipment (UE) that supports contention window updates with IAB nodes for unlicensed operations in accordance with aspects of the present disclosure.

FIG. 12 shows a diagram of a system 1200 including a device 1205 that supports contention window updates with IAB nodes for unlicensed operations in accordance with aspects of the present disclosure. The device 1205 may be an example of or include the components of a device 905, a device 1005, an IAB node, or a UE 115 (e.g., DU component) as described herein. The device 1205 may communicate wirelessly with one or more base stations 105, UEs 115, or any combination thereof. The device 1205 may include components for bi-directional voice and data communications including components for transmitting and receiving communications, including a communications manager 1210, an I/O controller 1215, a transceiver 1220, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In some other cases, the I/O controller 1215 may represent or interact with a modem, a keyboard, a mouse, a touchscreen, or a similar device. In some cases, the I/O controller 1215 may be implemented as part of a processor, such as the processor 1240. In some cases, a user may interact with the device 1205 via the I/O controller 1215 or via hardware components controlled by the I/O controller 1215.

In some cases, the device 1205 may include a single antenna 1225. However, in some other cases the device 1205 may have more than one antenna 1225, which may be capable of concurrently transmitting or receiving multiple wireless transmissions. The transceiver 1220 may communicate bi-directionally, via the one or more antennas 1225, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to one or more antennas 1225 for transmission, and to demodulate packets received from the one or more antennas 1225. The transceiver 1220, or the transceiver 1220 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting contention window updates with IAB nodes for unlicensed operations). For example, the device 1205 or a component of the device 1205 may include a processor 1240 and memory 1230 coupled to the processor 1240, the processor 1240 and memory 1230 configured to perform various functions described herein.

The communications manager 1210 may support wireless communications at an IAB node including a first component for communications with at least a parent node and a second component for communications with at least a child node in accordance with examples as disclosed herein. For example, the communications manager 1210 may be configured to provide or support a means for determining a first reference duration for the first component and a second reference duration for the second component. The communications manager 1210 may be configured to provide or support a means for monitoring for a first indication during the first reference duration to update a first contention window for the first component and for a second indication during the second reference duration to update a second contention window for the second component. The communications manager 1210 may be configured to provide or support a means for adjusting at least one of the first contention window and the second contention window based on the monitoring for the first indication and the second indication.

Additionally or alternatively, the communications manager 1210 may support wireless communications at an IAB node including a first component for communications with at least a parent node and a second component for communications with at least a child node in accordance with examples as disclosed herein. For example, the communications manager 1210 may be configured to provide or support a means for determining a reference duration for the first component and the second component. The communications manager 1210 may be configured to provide or support a means for monitoring for an indication during the reference duration to update a first contention window for the first component and a second contention window for the second component. The communications manager 1210 may be configured to provide or support a means for adjusting the first contention window and the second contention window based on the monitoring.

By including or configuring the communications manager 1210 in accordance with examples as described herein, the device 1205 may support techniques for more efficient utilization of communication resources and improved coordination between devices. For example, by determining the first reference duration and the second reference duration or determining the single reference duration, a processor of the IAB node may more efficiently enable communications via the first component and the second component on a same set of unlicensed resources.

In some examples, the communications manager 1210 may be configured to perform various operations (e.g., receiving, monitoring, transmitting) using or otherwise in cooperation with the transceiver 1220, the one or more antennas 1225, or any combination thereof. Although the communications manager 1210 is illustrated as a separate component, in some examples, one or more functions described with reference to the communications manager 1210 may be supported by or performed by the processor 1240, the memory 1230, the code 1235, or any combination thereof. For example, the code 1235 may include instructions executable by the processor 1240 to cause the device 1205 to perform various aspects of contention window updates with IAB nodes for unlicensed operations as described herein, or the processor 1240 and the memory 1230 may be otherwise configured to perform or support such operations.

Figure 13:
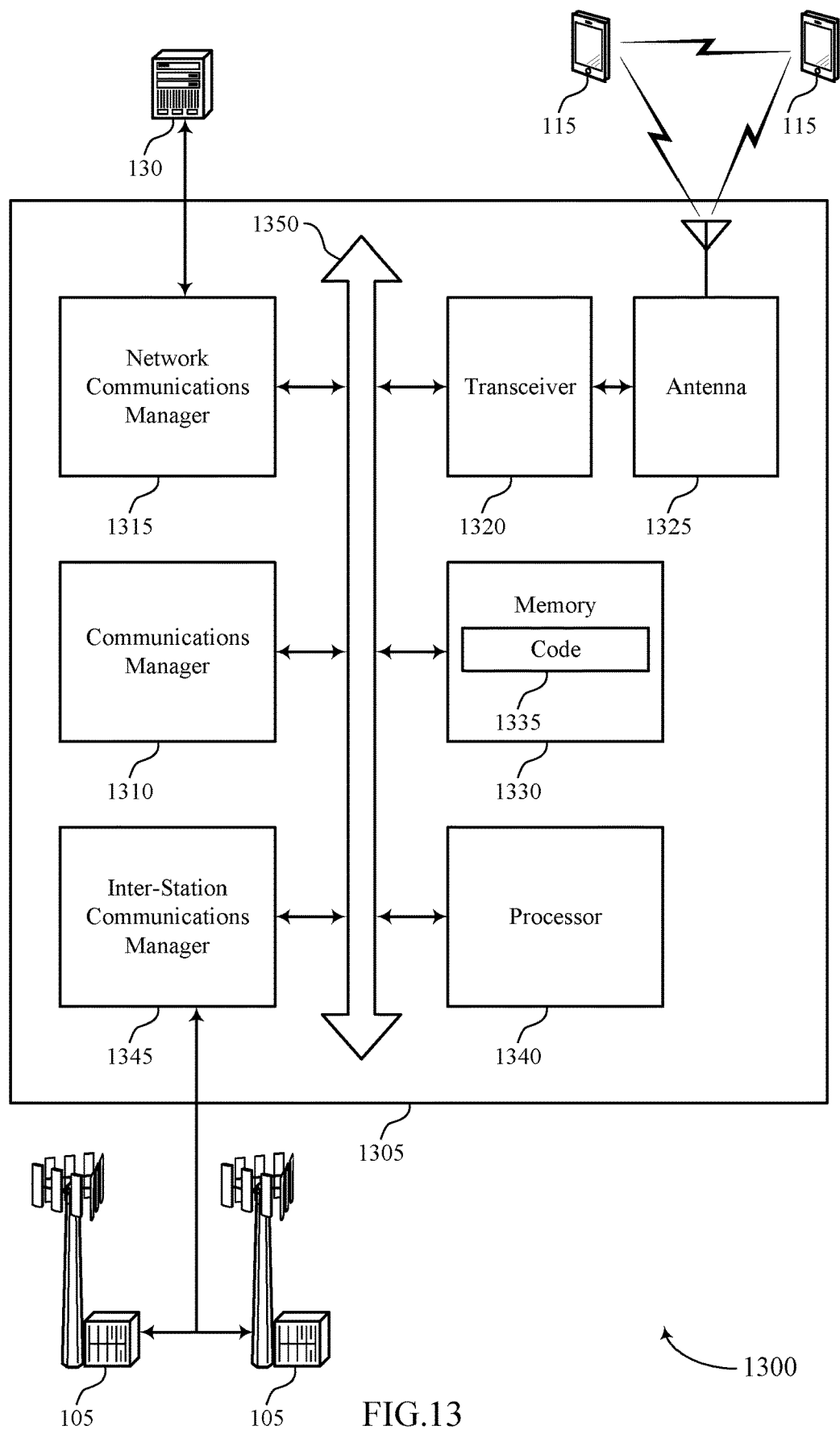
FIG. 13 shows a diagram of a system including a base station that supports contention window updates with IAB nodes for unlicensed operations in accordance with aspects of the present disclosure.

FIG. 13 shows a diagram of a system 1300 including a device 1305 that supports contention window updates with IAB nodes for unlicensed operations in accordance with aspects of the present disclosure. The device 1305 may be an example of or include the components of a device 905, a device 1005, an IAB node, or a base station 105 (e.g., MT component) as described herein. The device 1305 may communicate wirelessly with one or more base stations 105, UEs 115, or any combination thereof. The device 1305 may include components for bi-directional voice and data communications including components for transmitting and receiving communications, including a communications manager 1310, a network communications manager 1315, a transceiver 1320, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1315 may manage communications with a core network (e.g., via one or more wired backhaul links). For example, the network communications manager 1315 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1320 may communicate bi-directionally, via the one or more antennas 1325, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to one or more antennas 1325 for transmission, and to demodulate packets received from the one or more antennas 1325. The transceiver 1320, or the transceiver 1320 and one or more antennas 1325, may be an example of a transmitter 915, a transmitter 1015, a receiver 910, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting contention window updates with IAB nodes for unlicensed operations). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within a Long Term Evolution (LTE)/LTE-A wireless communications network technology to provide communication between base stations 105.

The communications manager 1310 may support wireless communications at an IAB node including a first component for communications with at least a parent node and a second component for communications with at least a child node in accordance with examples as disclosed herein. For example, the communications manager 1310 may be configured to provide or support a means for determining a first reference duration for the first component and a second reference duration for the second component. The communications manager 1310 may be configured to provide or support a means for monitoring for a first indication during the first reference duration to update a first contention window for the first component and for a second indication during the second reference duration to update a second contention window for the second component. The communications manager 1310 may be configured to provide or support a means for adjusting at least one of the first contention window and the second contention window based on the monitoring for the first indication and the second indication.

Additionally or alternatively, the communications manager 1310 may support wireless communications at an IAB node including a first component for communications with at least a parent node and a second component for communications with at least a child node in accordance with examples as disclosed herein. For example, the communications manager 1310 may be configured to provide or support a means for determining a reference duration for the first component and the second component. The communications manager 1310 may be configured to provide or support a means for monitoring for an indication during the reference duration to update a first contention window for the first component and a second contention window for the second component. The communications manager 1310 may be configured to provide or support a means for adjusting the first contention window and the second contention window based on the monitoring.

In some examples, the communications manager 1310 may be configured to perform various operations (e.g., receiving, monitoring, transmitting) using or otherwise in cooperation with the transceiver 1320, the one or more antennas 1325, or any combination thereof. Although the communications manager 1310 is illustrated as a separate component, in some examples, one or more functions described with reference to the communications manager 1310 may be supported by or performed by the processor 1340, the memory 1330, the code 1335, or any combination thereof. For example, the code 1335 may include instructions executable by the processor 1340 to cause the device 1305 to perform various aspects of contention window updates with IAB nodes for unlicensed operations as described herein, or the processor 1340 and the memory 1330 may be otherwise configured to perform or support such operations.

Figure 14:
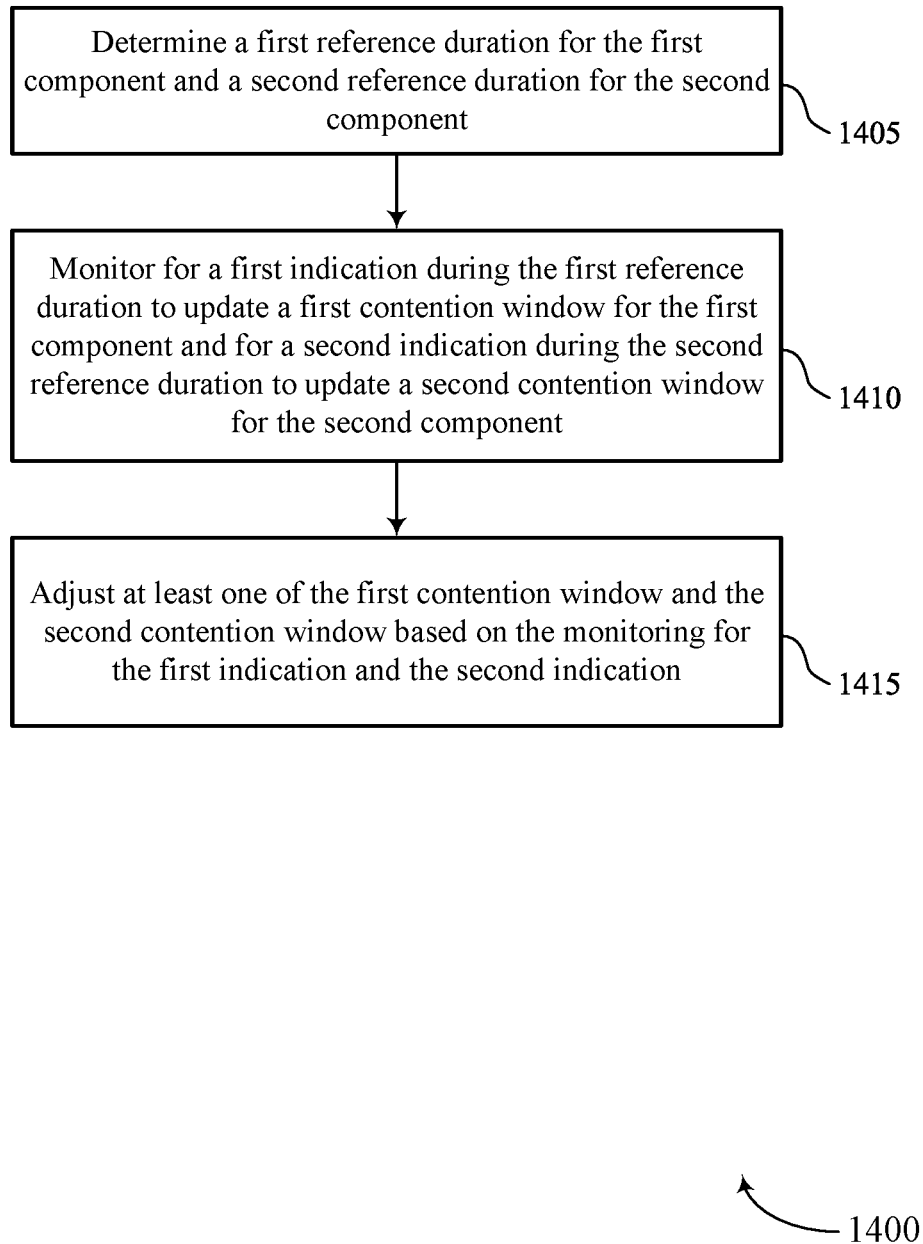
FIGS. 14 through 19 show flowcharts illustrating methods that support contention window updates with IAB nodes for unlicensed operations in accordance with aspects of the present disclosure.

FIG. 14 shows a flowchart illustrating a method 1400 that supports contention window updates with IAB nodes for unlicensed operations in accordance with aspects of the present disclosure. The operations of the method 1400 may be implemented by an IAB node, a UE 115 (e.g., DU component), or a base station 105 (e.g., MT component) or its components as described herein. For example, the operations of the method 1400 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include determining a first reference duration for the first component and a second reference duration for the second component. The operations of 1405 may be performed according to the methods described herein. In some examples, aspects of the operations of 1405 may be performed by a reference duration determination component 1125 as described with reference to FIG. 11.

At 1410, the method may include monitoring for a first indication during the first reference duration to update a first contention window for the first component and for a second indication during the second reference duration to update a second contention window for the second component. The operations of 1410 may be performed according to the methods described herein. In some examples, aspects of the operations of 1410 may be performed by an indication monitoring component 1130 as described with reference to FIG. 11.

At 1415, the method may include adjusting at least one of the first contention window and the second contention window based on the monitoring for the first indication and the second indication. The operations of 1415 may be performed according to the methods described herein. In some examples, aspects of the operations of 1415 may be performed by a contention window adjustment component 1135 as described with reference to FIG. 11.

Figure 15:
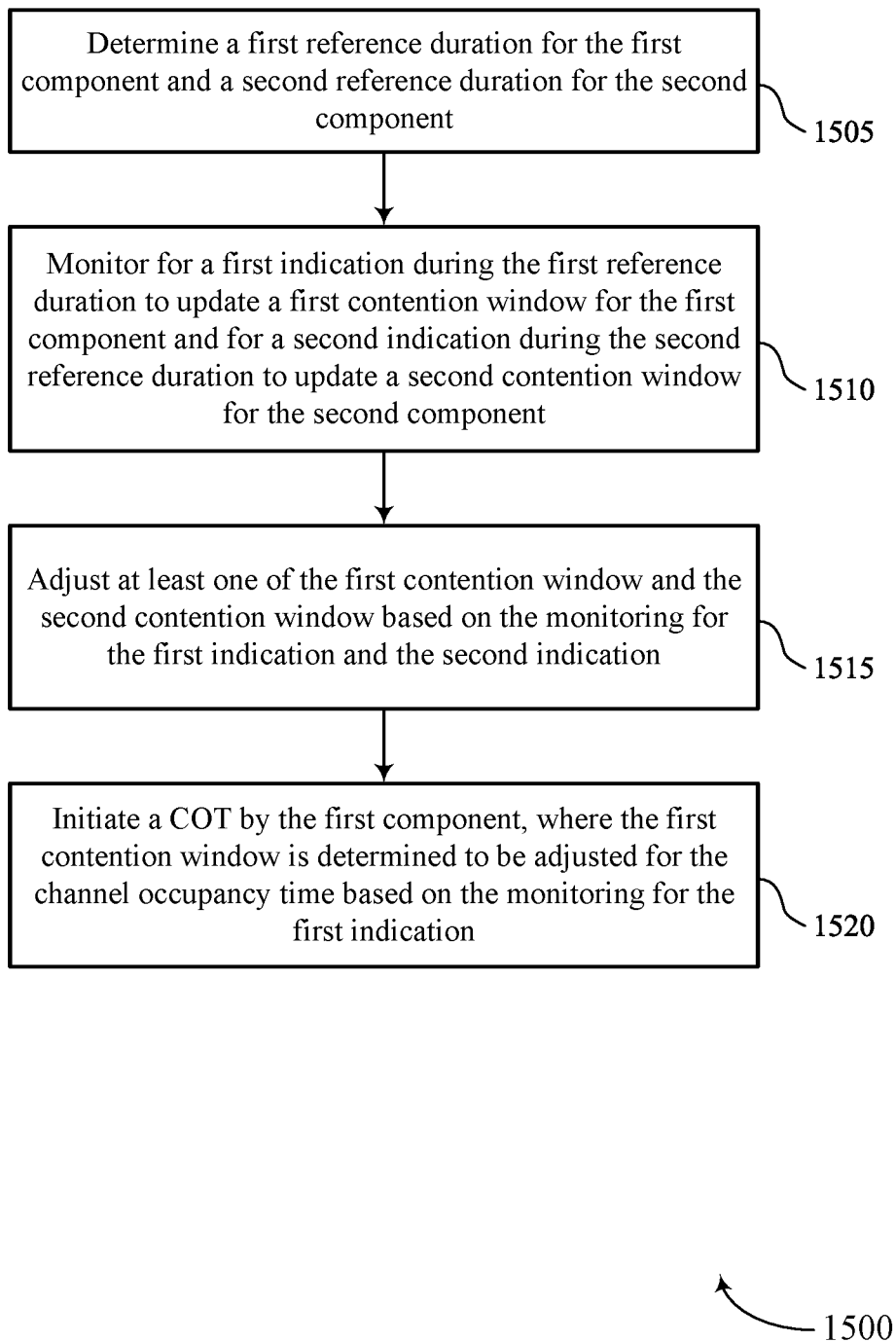

FIG. 15 shows a flowchart illustrating a method 1500 that supports contention window updates with IAB nodes for unlicensed operations in accordance with aspects of the present disclosure. The operations of the method 1500 may be implemented by an IAB node, a UE 115 (e.g., DU component), or a base station 105 (e.g., MT component) or its components as described herein. For example, the operations of the method 1500 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include determining a first reference duration for the first component and a second reference duration for the second component. The operations of 1505 may be performed according to the methods described herein. In some examples, aspects of the operations of 1505 may be performed by a reference duration determination component 1125 as described with reference to FIG. 11.

At 1510, the method may include monitoring for a first indication during the first reference duration to update a first contention window for the first component and for a second indication during the second reference duration to update a second contention window for the second component. The operations of 1510 may be performed according to the methods described herein. In some examples, aspects of the operations of 1510 may be performed by an indication monitoring component 1130 as described with reference to FIG. 11.

At 1515, the method may include adjusting at least one of the first contention window and the second contention window based on the monitoring for the first indication and the second indication. The operations of 1515 may be performed according to the methods described herein. In some examples, aspects of the operations of 1515 may be performed by a contention window adjustment component 1135 as described with reference to FIG. 11.

At 1520, the method may include initiating a channel occupancy time by the first component, where the first contention window is determined to be adjusted for the channel occupancy time based on the monitoring for the first indication. The operations of 1520 may be performed according to the methods described herein. In some examples, aspects of the operations of 1520 may be performed by a separate contention window update component 1140 as described with reference to FIG. 11.

Figure 16:
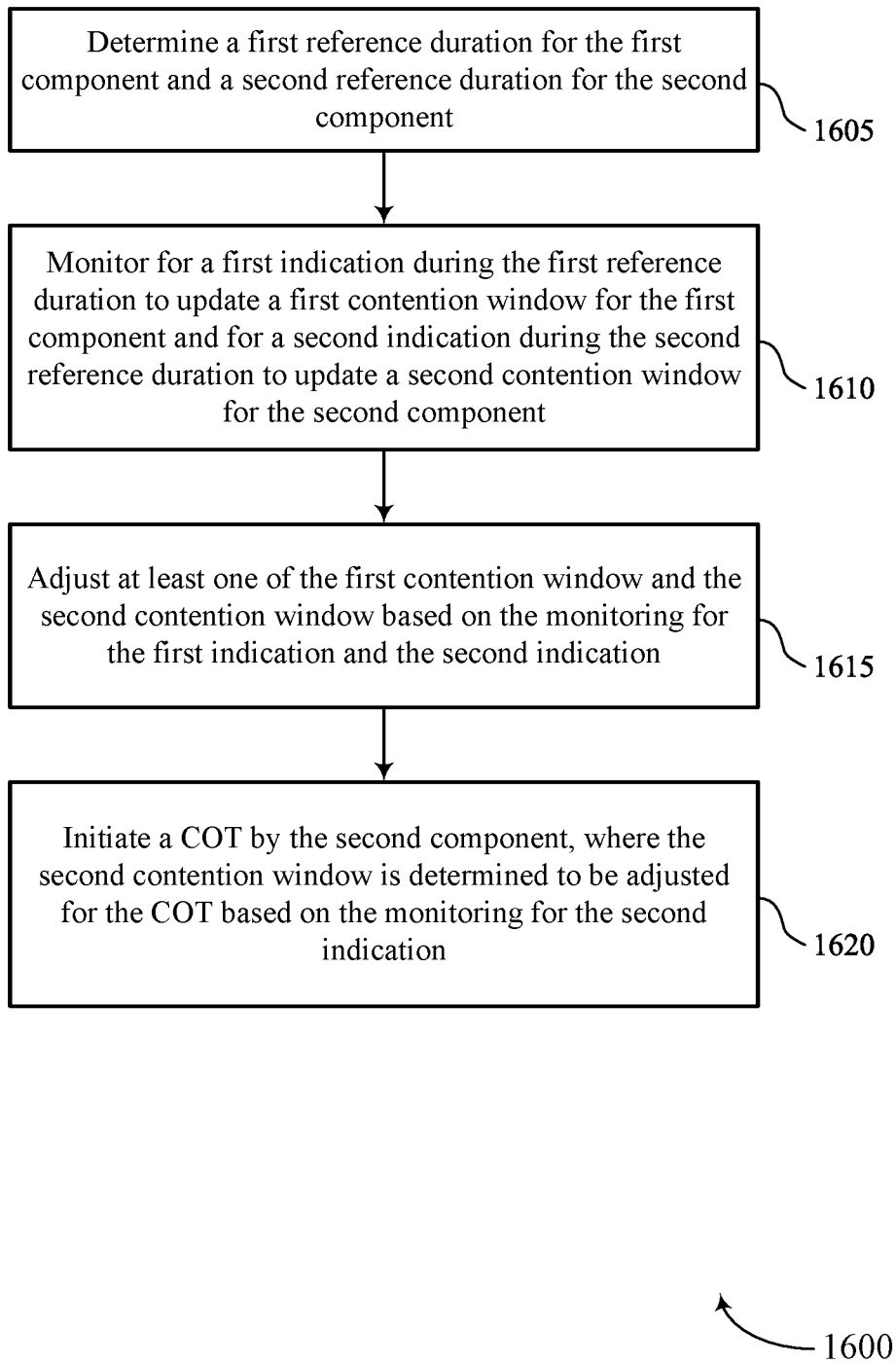

FIG. 16 shows a flowchart illustrating a method 1600 that supports contention window updates with IAB nodes for unlicensed operations in accordance with aspects of the present disclosure. The operations of the method 1600 may be implemented by an IAB node, a UE 115 (e.g., DU component), or a base station 105 (e.g., MT component) or its components as described herein. For example, the operations of the method 1600 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include determining a first reference duration for the first component and a second reference duration for the second component. The operations of 1605 may be performed according to the methods described herein. In some examples, aspects of the operations of 1605 may be performed by a reference duration determination component 1125 as described with reference to FIG. 11.

At 1610, the method may include monitoring for a first indication during the first reference duration to update a first contention window for the first component and for a second indication during the second reference duration to update a second contention window for the second component. The operations of 1610 may be performed according to the methods described herein. In some examples, aspects of the operations of 1610 may be performed by an indication monitoring component 1130 as described with reference to FIG. 11.

At 1615, the method may include adjusting at least one of the first contention window and the second contention window based on the monitoring for the first indication and the second indication. The operations of 1615 may be performed according to the methods described herein. In some examples, aspects of the operations of 1615 may be performed by a contention window adjustment component 1135 as described with reference to FIG. 11.

At 1620, the method may include initiating a channel occupancy time by the second component, where the second contention window is determined to be adjusted for the channel occupancy time based on the monitoring for the second indication. The operations of 1620 may be performed according to the methods described herein. In some examples, aspects of the operations of 1620 may be performed by a separate contention window update component 1140 as described with reference to FIG. 11.

Figure 17:
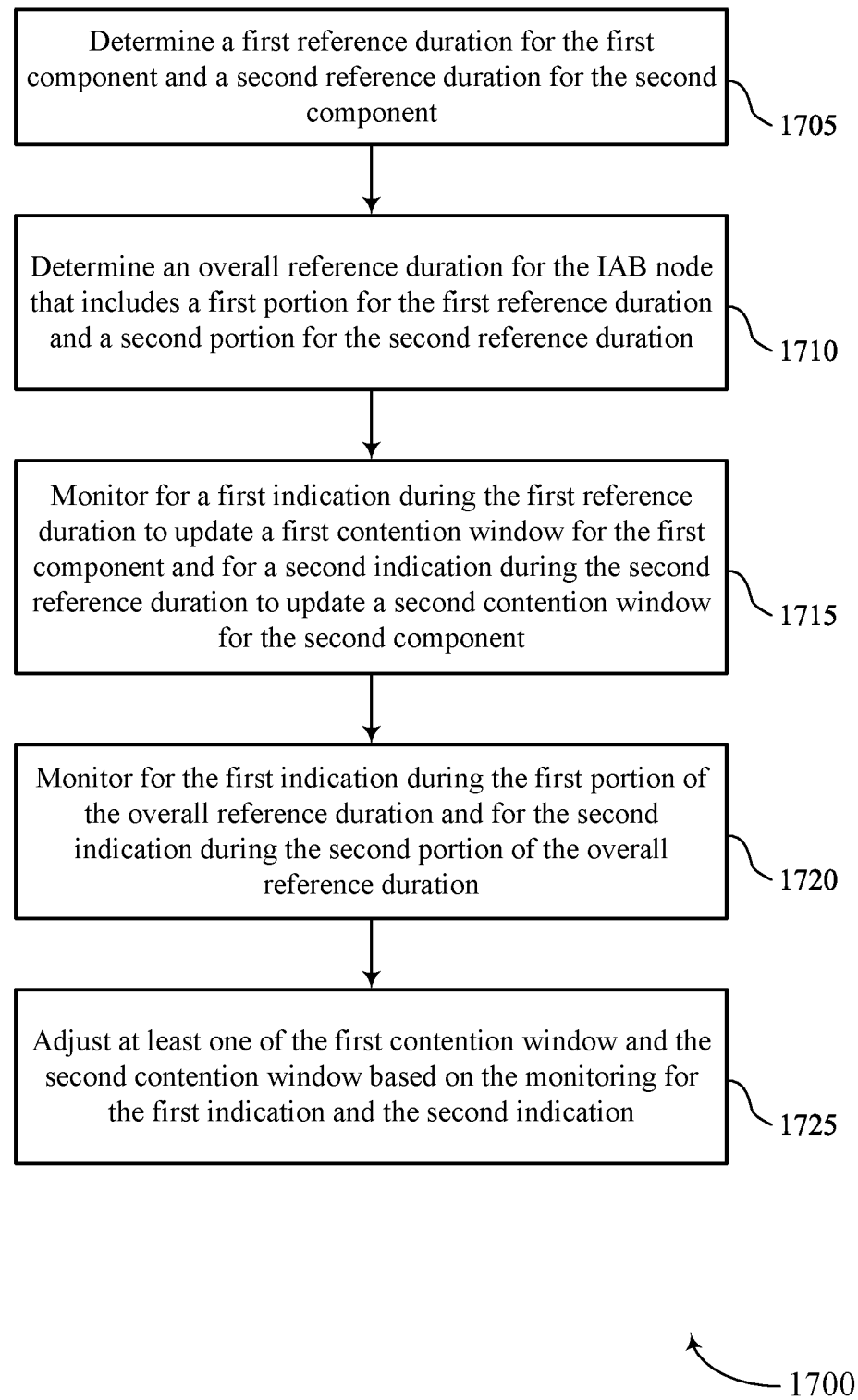

FIG. 17 shows a flowchart illustrating a method 1700 that supports contention window updates with IAB nodes for unlicensed operations in accordance with aspects of the present disclosure. The operations of the method 1700 may be implemented by an IAB node, a UE 115 (e.g., DU component), or a base station 105 (e.g., MT component) or its components as described herein. For example, the operations of the method 1700 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include determining a first reference duration for the first component and a second reference duration for the second component. The operations of 1705 may be performed according to the methods described herein. In some examples, aspects of the operations of 1705 may be performed by a reference duration determination component 1125 as described with reference to FIG. 11.

At 1710, the method may include determining an overall reference duration for the IAB node that includes a first portion for the first reference duration and a second portion for the second reference duration. The operations of 1710 may be performed according to the methods described herein. In some examples, aspects of the operations of 1710 may be performed by a joint reference duration component 1145 as described with reference to FIG. 11.

At 1715, the method may include monitoring for a first indication during the first reference duration to update a first contention window for the first component and for a second indication during the second reference duration to update a second contention window for the second component. The operations of 1715 may be performed according to the methods described herein. In some examples, aspects of the operations of 1715 may be performed by an indication monitoring component 1130 as described with reference to FIG. 11.

At 1720, the method may include monitoring for the first indication during the first portion of the overall reference duration and for the second indication during the second portion of the overall reference duration. The operations of 1720 may be performed according to the methods described herein. In some examples, aspects of the operations of 1720 may be performed by a joint reference duration component 1145 as described with reference to FIG. 11.

At 1725, the method may include adjusting at least one of the first contention window and the second contention window based on the monitoring for the first indication and the second indication. The operations of 1725 may be performed according to the methods described herein. In some examples, aspects of the operations of 1725 may be performed by a contention window adjustment component 1135 as described with reference to FIG. 11.

Figure 18:
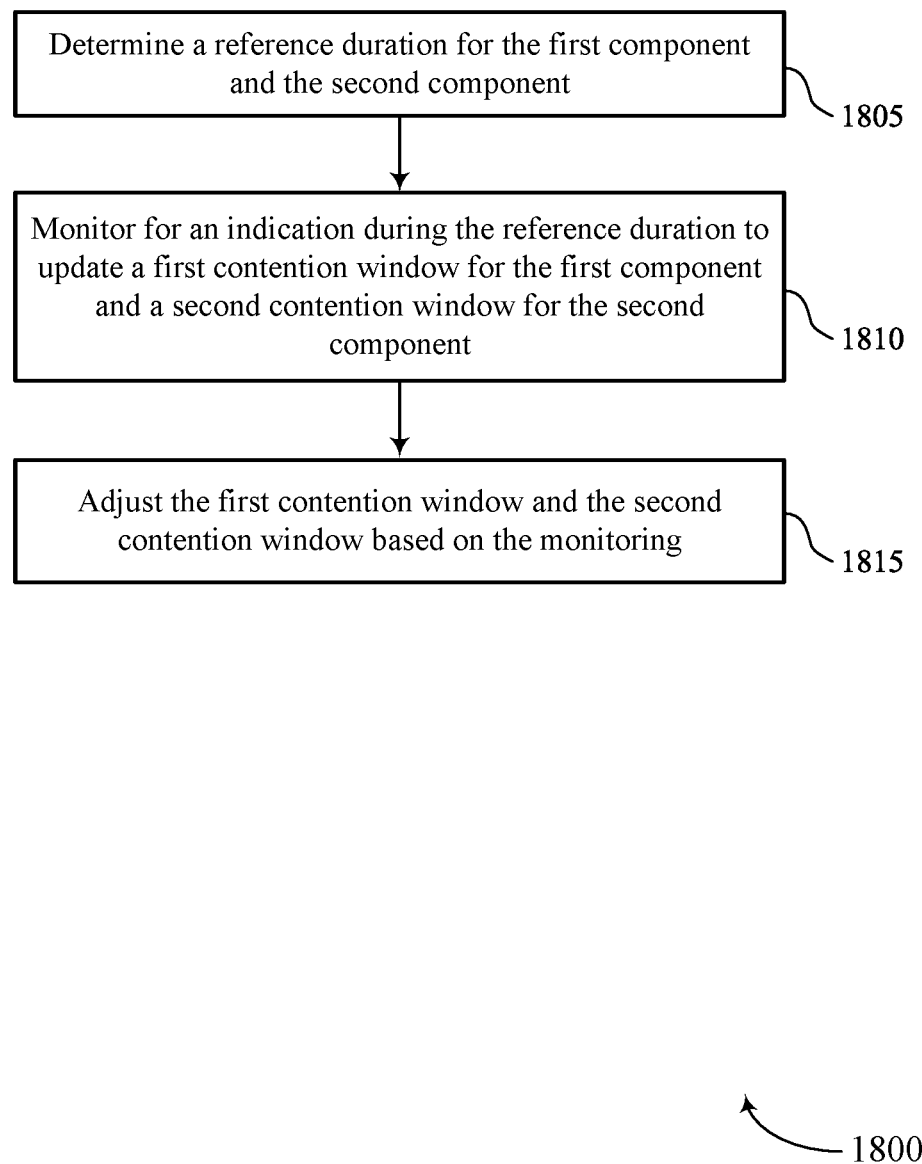

FIG. 18 shows a flowchart illustrating a method 1800 that supports contention window updates with IAB nodes for unlicensed operations in accordance with aspects of the present disclosure. The operations of the method 1800 may be implemented by an IAB node, a UE 115 (e.g., DU component), or a base station 105 (e.g., MT component) or its components as described herein. For example, the operations of the method 1800 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include determining a reference duration for the first component and the second component. The operations of 1805 may be performed according to the methods described herein. In some examples, aspects of the operations of 1805 may be performed by a reference duration determination component 1125 as described with reference to FIG. 11.

At 1810, the method may include monitoring for an indication during the reference duration to update a first contention window for the first component and a second contention window for the second component. The operations of 1810 may be performed according to the methods described herein. In some examples, aspects of the operations of 1810 may be performed by an indication monitoring component 1130 as described with reference to FIG. 11.

At 1815, the method may include adjusting the first contention window and the second contention window based on the monitoring. The operations of 1815 may be performed according to the methods described herein. In some examples, aspects of the operations of 1815 may be performed by a contention window adjustment component 1135 as described with reference to FIG. 11.

Figure 19:
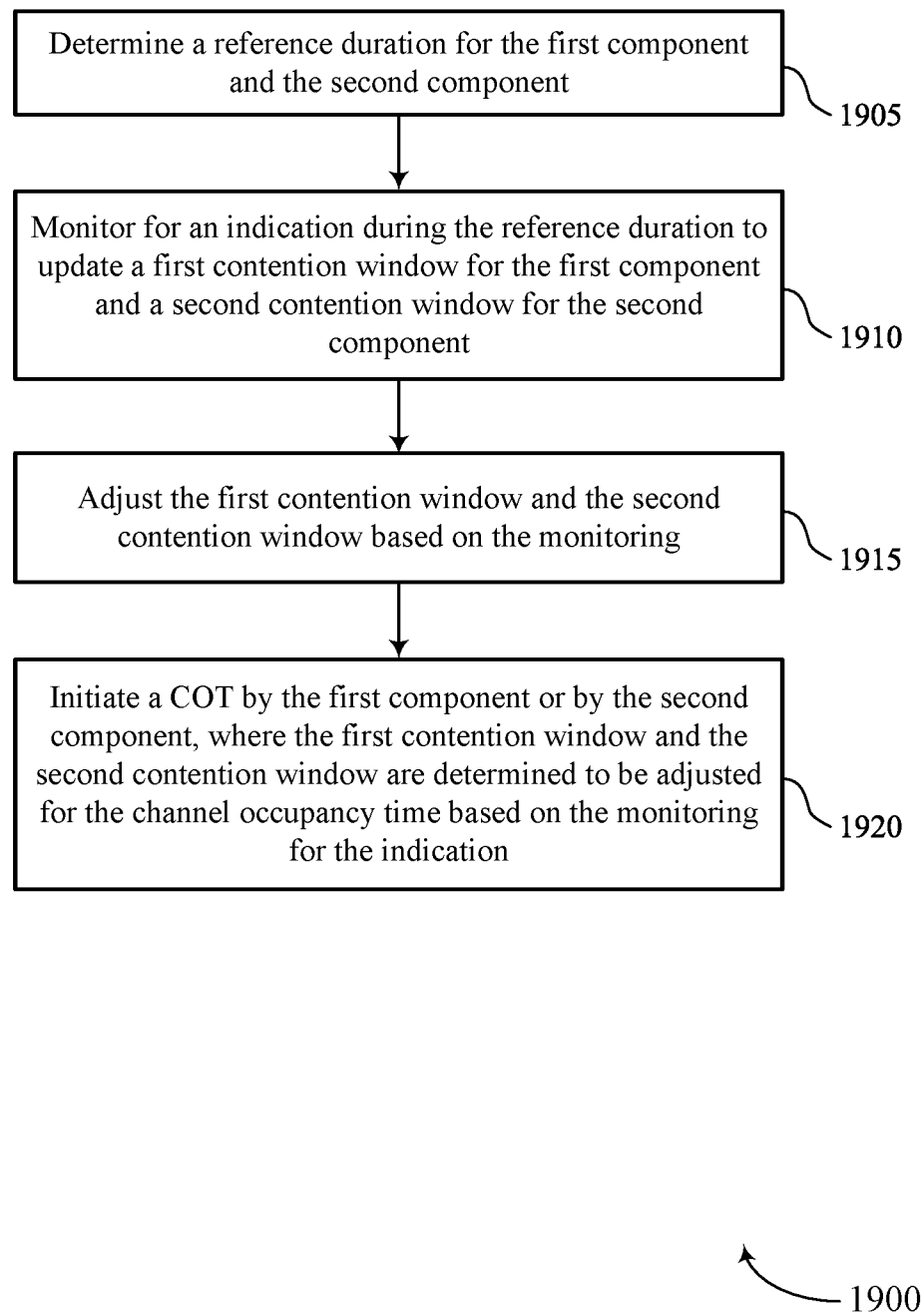

FIG. 19 shows a flowchart illustrating a method 1900 that supports contention window updates with IAB nodes for unlicensed operations in accordance with aspects of the present disclosure. The operations of the method 1900 may be implemented by an IAB node, a UE 115 (e.g., DU component), or a base station 105 (e.g., MT component) or its components as described herein. For example, the operations of the method 1900 may be performed by a UE 115 or a base station 105 as described with reference to FIGS. 1 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include determining a reference duration for the first component and the second component. The operations of 1905 may be performed according to the methods described herein. In some examples, aspects of the operations of 1905 may be performed by a reference duration determination component 1125 as described with reference to FIG. 11.

At 1910, the method may include monitoring for an indication during the reference duration to update a first contention window for the first component and a second contention window for the second component. The operations of 1910 may be performed according to the methods described herein. In some examples, aspects of the operations of 1910 may be performed by an indication monitoring component 1130 as described with reference to FIG. 11.

At 1915, the method may include adjusting the first contention window and the second contention window based on the monitoring. The operations of 1915 may be performed according to the methods described herein. In some examples, aspects of the operations of 1915 may be performed by a contention window adjustment component 1135 as described with reference to FIG. 11.

At 1920, the method may include initiating a channel occupancy time by the first component or by the second component, where the first contention window and the second contention window are determined to be adjusted for the channel occupancy time based on the monitoring for the indication. The operations of 1920 may be performed according to the methods described herein. In some examples, aspects of the operations of 1920 may be performed by a joint contention window update component 1160 as described with reference to FIG. 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at an integrated access and backhaul node comprising a first component for communications with at least a parent node and a second component for communications with at least a child node, comprising: determining a first reference duration for the first component and a second reference duration for the second component; monitoring for a first indication during the first reference duration to update a first contention window for the first component and for a second indication during the second reference duration to update a second contention window for the second component; and adjusting at least one of the first contention window and the second contention window based at least in part on the monitoring for the first indication and the second indication.

Aspect 2: The method of aspect 1, further comprising: initiating a channel occupancy time by the first component, wherein the first contention window is determined to be adjusted for the channel occupancy time based at least in part on the monitoring for the first indication.

Aspect 3: The method of aspect 2, wherein the channel occupancy time is shared with the second component, the method further comprising: refraining from adjusting the second contention window based at least in part on the monitoring for the first indication.

Aspect 4: The method of any of aspects 1 through 3, further comprising: initiating a channel occupancy time by the second component, wherein the second contention window is determined to be adjusted for the channel occupancy time based at least in part on the monitoring for the second indication.

Aspect 5: The method of aspect 4, wherein the channel occupancy time is shared with the first component, the method further comprising: refraining from adjusting the first contention window based at least in part on the monitoring for the second indication.

Aspect 6: The method of any of aspects 1 through 5, wherein determining the first reference duration for the first component and the second reference duration for the second component comprises: determining an overall reference duration for the integrated access and backhaul node that comprises a first portion for the first reference duration and a second portion for the second reference duration; and monitoring for the first indication during the first portion of the overall reference duration and for the second indication during the second portion of the overall reference duration.

Aspect 7: The method of any of aspects 1 through 6, further comprising: determining a first random counter for a first channel access procedure for the first component and a second random counter for a second channel access procedure for the second component.

Aspect 8: The method of aspect 7, wherein the first random counter is used for a channel occupancy time initiated by the first component and is based at least in part on the first contention window for the first component.

Aspect 9: The method of any of aspects 7 through 8, wherein the second random counter is used for a channel occupancy time initiated by the second component and is based at least in part on the second contention window for the second component.

Aspect 10: The method of any of aspects 1 through 9, further comprising: determining a joint random counter for a first channel access procedure for the first component and second channel access procedure for the second component.

Aspect 11: The method of aspect 10, wherein the joint random counter is based at least in part on a maximum contention window size, a minimum contention window size, an average contention window size, or an additional function of the first contention window and the second contention window.

Aspect 12: The method of any of aspects 1 through 11, wherein determining the first reference duration for the first component comprises: determining a starting point for the first reference duration and an ending point for the first reference duration.

Aspect 13: The method of aspect 12, wherein the starting point for the first reference duration comprises a start of a channel occupancy initiated by the first component.

Aspect 14: The method of any of aspects 12 through 13, wherein the ending point for the first reference duration comprises a slot boundary where at least one uplink channel is transmitted or an end of a transmission burst that contains a transmitted uplink channel.

Aspect 15: The method of any of aspects 1 through 14, wherein determining the second reference duration for the second component comprises: determining a starting point for the second reference duration and an ending point for the second reference duration.

Aspect 16: The method of aspect 15, wherein the starting point for the second reference duration comprises a start of a channel occupancy initiated by the second component.

Aspect 17: The method of any of aspects 15 through 16, wherein the ending point for the second reference duration comprises a slot boundary where at least one downlink channel is fully transmitted or an end of a transmission burst that contains a fully transmitted downlink channel.

Aspect 18: The method of any of aspects 1 through 17, wherein the first indication comprises a new data indicator for a message transmitted during the first reference duration, a value of a code block group transmission information field for a code block group transmitted during the first reference duration, or a combination thereof.

Aspect 19: The method of any of aspects 1 through 18, wherein the second indication comprises an acknowledgment message received during the second reference duration, an amount of acknowledgment messages that exceeds a threshold value received during the second reference duration, successfully receiving an uplink channel on granted resources during the second reference duration, or a combination thereof.

Aspect 20: A method for wireless communications at an integrated access and backhaul node comprising a first component for communications with at least a parent node and a second component for communications with at least a child node, comprising: determining a reference duration for the first component and the second component; monitoring for an indication during the reference duration to update a first contention window for the first component and a second contention window for the second component; and adjusting the first contention window and the second contention window based at least in part on the monitoring.

Aspect 21: The method of aspect 20, further comprising: initiating a channel occupancy time by the first component or by the second component, wherein the first contention window and the second contention window are determined to be adjusted for the channel occupancy time based at least in part on the monitoring for the indication.

Aspect 22: The method of any of aspects 20 through 21, further comprising: determining a first random counter for a first channel access procedure for the first component and a second random counter for a second channel access procedure for the second component.

Aspect 23: The method of aspect 22, wherein the first random counter is used for a channel occupancy time initiated by the first component and is based at least in part on the first contention window for the first component.

Aspect 24: The method of any of aspects 22 through 23, wherein the second random counter is used for a channel occupancy time initiated by the second component and is based at least in part on the second contention window for the second component.

Aspect 25: The method of any of aspects 20 through 24, further comprising: determining a joint random counter for a first channel access procedure for the first component and second channel access procedure for the second component.

Aspect 26: The method of aspect 25, wherein the joint random counter is based at least in part on a maximum contention window size, a minimum contention window size, an average contention window size, or an additional function of the first contention window and the second contention window.

Aspect 27: The method of any of aspects 20 through 26, wherein determining the reference duration comprises: determining a starting point for the reference duration and an ending point for the reference duration.

Aspect 28: The method of aspect 27, wherein the starting point for the reference duration comprises a start of a channel occupancy initiated by the first component or by the second component.

Aspect 29: The method of any of aspects 27 through 28, wherein the ending point for the reference duration comprises a slot boundary where at least one downlink channel is fully transmitted, an end of a transmission burst that contains a fully transmitted downlink channel, a slot boundary where at least one uplink channel is transmitted, or an end of a transmission burst that contains a transmitted uplink channel.

Aspect 30: The method of any of aspects 20 through 29, wherein the indication comprises a new data indicator for a message transmitted during the first reference duration, a value of a code block group transmission information field for a code block group transmitted during the first reference duration, an acknowledgment message received during the second reference duration, an amount of acknowledgment messages that exceeds a threshold value received during the second reference duration, successfully receiving an uplink channel on granted resources during the second reference duration, or a combination thereof.

Aspect 31: An apparatus for wireless communications at an integrated access and backhaul node comprising a first component for communications with at least a parent node and a second component for communications with at least a child node, comprising a processor; memory coupled with the processor; and instructions stored in the memory and executable by the processor to cause the apparatus to perform a method of any of aspects 1 through 19.

Aspect 32: An apparatus for wireless communications at an integrated access and backhaul node comprising a first component for communications with at least a parent node and a second component for communications with at least a child node, comprising at least one means for performing a method of any of aspects 1 through 19.

Aspect 33: A non-transitory computer-readable medium storing code for wireless communications at an integrated access and backhaul node comprising a first component for communications with at least a parent node and a second component for communications with at least a child node, the code comprising instructions executable by a processor to perform a method of any of aspects 1 through 19.

Aspect 34: An apparatus for wireless communications at an integrated access and backhaul node comprising a first component for communications with at least a parent node and a second component for communications with at least a child node, comprising a processor; memory coupled with the processor; and instructions stored in the memory and executable by the processor to cause the apparatus to perform a method of any of aspects 20 through 30.

Aspect 35: An apparatus for wireless communications at an integrated access and backhaul node comprising a first component for communications with at least a parent node and a second component for communications with at least a child node, comprising at least one means for performing a method of any of aspects 20 through 30.

Aspect 36: A non-transitory computer-readable medium storing code for wireless communications at an integrated access and backhaul node comprising a first component for communications with at least a parent node and a second component for communications with at least a child node, the code comprising instructions executable by a processor to perform a method of any of aspects 20 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at an integrated access and backhaul node comprising a first component for communications with at least a parent node and a second component for communications with at least a child node, comprising:
determining a first reference duration associated with the first component of the integrated access and backhaul node and a second reference duration associated with the second component of the integrated access and backhaul node;
monitoring for a first indication during the first reference duration to update a first contention window for the first component and for a second indication during the second reference duration to update a second contention window for the second component; and
adjusting at least one of the first contention window and the second contention window based at least in part on the monitoring for the first indication and the second indication.

2. The method of claim 1, further comprising:
initiating a channel occupancy time by the first component, wherein the first contention window is determined to be adjusted for the channel occupancy time based at least in part on the monitoring for the first indication.

3. The method of claim 2, wherein the channel occupancy time is shared with the second component, the method further comprising:
refraining from adjusting the second contention window based at least in part on the monitoring for the first indication.

4. The method of claim 1, further comprising:
initiating a channel occupancy time by the second component, wherein the second contention window is determined to be adjusted for the channel occupancy time based at least in part on the monitoring for the second indication.

5. The method of claim 4, wherein the channel occupancy time is shared with the first component, the method further comprising:
refraining from adjusting the first contention window based at least in part on the monitoring for the second indication.

6. The method of claim 1, wherein determining the first reference duration for the first component and the second reference duration for the second component comprises:
determining an overall reference duration for the integrated access and backhaul node that comprises a first portion for the first reference duration and a second portion for the second reference duration; and
monitoring for the first indication during the first portion of the overall reference duration and for the second indication during the second portion of the overall reference duration.

7. The method of claim 1, further comprising:
determining a first random counter for a first channel access procedure for the first component and a second random counter for a second channel access procedure for the second component.

8. The method of claim 7, wherein the first random counter is used for a channel occupancy time initiated by the first component and is based at least in part on the first contention window for the first component; and the second random counter is used for a channel occupancy time initiated by the second component and is based at least in part on the second contention window for the second component.

9. The method of claim 1, further comprising:
determining a joint random counter for a first channel access procedure for the first component and a second channel access procedure for the second component.

10. The method of claim 9, wherein the joint random counter is based at least in part on a maximum contention window size, a minimum contention window size, an average contention window size, or an additional function of the first contention window and the second contention window.

11. The method of claim 1, wherein determining the first reference duration for the first component comprises:
determining a starting point for the first reference duration and an ending point for the first reference duration.

12. The method of claim 11, wherein the starting point for the first reference duration comprises a start of a channel occupancy initiated by the first component; and the ending point for the first reference duration comprises a slot boundary where at least one uplink channel is transmitted or an end of a transmission burst that contains a transmitted uplink channel.

13. The method of claim 1, wherein determining the second reference duration for the second component comprises:
determining a starting point for the second reference duration and an ending point for the second reference duration.

14. The method of claim 13, wherein the starting point for the second reference duration comprises a start of a channel occupancy initiated by the second component; and the ending point for the second reference duration comprises a slot boundary where at least one downlink channel is fully transmitted or an end of a transmission burst that contains a fully transmitted downlink channel.

15. The method of claim 1, wherein the first indication comprises a new data indicator for a message transmitted during the first reference duration, a value of a code block group transmission information field for a code block group transmitted during the first reference duration, or a combination thereof; and the second indication comprises an acknowledgment message received during the second reference duration, an amount of acknowledgment messages that exceeds a threshold value received during the second reference duration, successfully receiving an uplink channel on granted resources during the second reference duration, or a combination thereof.

16. A method for wireless communications at an integrated access and backhaul node comprising a first component for communications with at least a parent node and a second component for communications with at least a child node, comprising:

determining a reference duration for the first component and the second component;

monitoring for an indication during the reference duration to update a first contention window for the first component and a second contention window for the second component; and adjusting the first contention window and the second contention window based at least in part on the monitoring.

17. The method of claim 16, further comprising:

initiating a channel occupancy time by the first component or by the second component, wherein the first contention window and the second contention window are determined to be adjusted for the channel occupancy time based at least in part on the monitoring for the indication.

18. The method of claim 16, further comprising:

determining a first random counter for a first channel access procedure for the first component and a second random counter for a second channel access procedure for the second component.

19. The method of claim 18, wherein the first random counter is used for a channel occupancy time initiated by the first component and is based at least in part on the first contention window for the first component; and the second random counter is used for a channel occupancy time initiated by the second component and is based at least in part on the second contention window for the second component.

20. The method of claim 16, further comprising:

determining a joint random counter for a first channel access procedure for the first component and second channel access procedure for the second component.

21. The method of claim 20, wherein the joint random counter is based at least in part on a maximum contention window size, a minimum contention window size, an average contention window size, or an additional function of the first contention window and the second contention window.

22. The method of claim 16, wherein determining the reference duration comprises:

determining a starting point for the reference duration and an ending point for the reference duration.

23. The method of claim 22, wherein the starting point for the reference duration comprises a start of a channel occupancy initiated by the first component or by the second component; and the ending point for the reference duration comprises a slot boundary where at least one downlink channel is fully transmitted, an end of a transmission burst that contains a fully transmitted downlink channel, a slot boundary where at least one uplink channel is transmitted, or an end of a transmission burst that contains a transmitted uplink channel.

24. The method of claim 16, wherein the indication comprises a new data indicator for a message transmitted during the reference duration, a value of a code block group transmission information field for a code block group transmitted during the reference duration, an acknowledgment message received during the reference duration, an amount of acknowledgment messages that exceeds a threshold value received during the reference duration, successfully receiving an uplink channel on granted resources during the reference duration, or a combination thereof.

25. An apparatus for wireless communications at an integrated access and backhaul node comprising a first component for communications with at least a parent node and a second component for communications with at least a child node, comprising:

a processor;

memory coupled with the processor; and instructions stored in the memory and executable by the processor to cause the apparatus to:

determine a first reference duration associated with the first component of the integrated access and backhaul node and a second reference duration associated with the second component of the integrated access and backhaul node;

monitor for a first indication during the first reference duration to update a first contention window for the first component and for a second indication during the second reference duration to update a second contention window for the second component; and adjust at least one of the first contention window and the second contention window based at least in part on the monitoring for the first indication and the second indication.

26. The apparatus of claim 25, wherein the instructions are further executable by the processor to cause the apparatus to:

initiate a channel occupancy time by the first component, wherein the first contention window is determined to be adjusted for the channel occupancy time based at least in part on the monitoring for the first indication.

27. The apparatus of claim 25, wherein the instructions are further executable by the processor to cause the apparatus to:

initiate a channel occupancy time by the second component, wherein the second contention window is determined to be adjusted for the channel occupancy time based at least in part on the monitoring for the second indication.

28. The apparatus of claim 25, wherein the instructions to determine the first reference duration for the first component and the second reference duration for the second component are executable by the processor to cause the apparatus to:

determine an overall reference duration for the integrated access and backhaul node that comprises a first portion for the first reference duration and a second portion for the second reference duration; and monitor for the first indication during the first portion of the overall reference duration and for the second indication during the second portion of the overall reference duration.

29. An apparatus for wireless communications at an integrated access and backhaul node comprising a first component for communications with at least a parent node and a second component for communications with at least a child node, comprising:

a processor;

memory coupled with the processor; and instructions stored in the memory and executable by the processor to cause the apparatus to:

determine a reference duration for the first component and the second component;

monitor for an indication during the reference duration to update a first contention window for the first component and a second contention window for the second component; and adjust the first contention window and the second contention window based at least in part on the monitoring.

30. The apparatus of claim 29, wherein the instructions are further executable by the processor to cause the apparatus to:

initiate a channel occupancy time by the first component or by the second component, wherein the first contention window and the second contention window are determined to be adjusted for the channel occupancy time based at least in part on the monitoring for the indication.

* * * * *